United States Patent
Ito et al.

(10) Patent No.: US 7,373,584 B2
(45) Date of Patent: May 13, 2008

(54) SEMICONDUCTOR MEMORY DEVICE AND ERROR CORRECTION METHOD THEREOF

(75) Inventors: Yutaka Ito, Tokyo (JP); Shigeo Takeuchi, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 391 days.

(21) Appl. No.: 11/152,386

(22) Filed: Jun. 15, 2005

(65) Prior Publication Data
US 2005/0283704 A1    Dec. 22, 2005

(30) Foreign Application Priority Data
Jun. 18, 2004    (JP)    ............... 2004-181905

(51) Int. Cl.
*G01C 29/00*    (2006.01)
(52) U.S. Cl. .................... 714/763; 714/758
(58) Field of Classification Search ............ 714/763, 714/758, 766
See application file for complete search history.

(56) References Cited

U.S. PATENT DOCUMENTS

| | | | |
|---|---|---|---|
| 5,325,371 A * | 6/1994 | Maeda et al. ............... | 714/756 |
| 6,199,139 B1 * | 3/2001 | Katayama et al. .......... | 711/106 |
| 6,792,567 B2 * | 9/2004 | Laurent ...................... | 714/763 |
| 7,171,605 B2 * | 1/2007 | White .......................... | 714/763 |
| 7,203,886 B2 * | 4/2007 | Brown et al. ............... | 714/758 |

FOREIGN PATENT DOCUMENTS

JP    2002-56671    2/2002

* cited by examiner

*Primary Examiner*—Jacques Louis-Jacques
*Assistant Examiner*—Esaw Abraham
(74) *Attorney, Agent, or Firm*—McGinn IP Law Group, PLLC

(57) ABSTRACT

A semiconductor memory device includes a memory array having a data area and a check code area and a refresh control for controlling a refresh operation in a data holding state. The device also includes an operation system for executing an encoding operation for generating the check code using a bit string in the data area and a decoding operation for performing the error detection/correction of the data using the check code. Additionally, the device includes an encode controller for controlling an encode process in which, in a change to the data holding state, a first and second code are written in the check code area. Furthermore, the device includes a decode controller for controlling a decode process in which, at the end of the data holding state, first and second bit error correction based on each code are alternately performed, and the first and the second bit error correction are performed at least twice respectively.

15 Claims, 23 Drawing Sheets

FIG.3

MEMORY CONTROL COMMANDS

| CONTROL SIGNAL COMMAND | CKE n-1 | CKE n | /RAS | /CAS | /WE | FUNCTION |
|---|---|---|---|---|---|---|
| ACT | H | H | L | H | H | ROW ADDRESS ACTIVE (BANK ACTIVE) |
| RD | H | H | H | L | H | MEMORY READ |
| WT | H | H | H | L | L | MEMORY WRITE |
| REF | H | H | L | L | H | REFRESH |
| PRE | H | H | L | H | L | PRECHAGE |
| Entry | H | L | L | L | H | CHANGE FROM NORMAL OPERATION MODE TO LOW-POWER-CONSUMPTION MODE |
| Exit | L | H | H | H | H | CHANGE FROM LOW-POWER-CONSUMPTION MODE TO NORMAL OPERATION MODE |

FIG.10

CODEC CONTROL COMMANDS

| COMMAND \ SIGNAL | fwd_clk | bwd_clk | enb | sel | init |
|---|---|---|---|---|---|
| GEN_CODE | 1 | 0 | 1 | 0 | 1 |
| WT_CODE | 1 | 0 | 0 | 0 | 1 |
| REVERSE | 0 | 1 | 0 | 0 | 1 |
| CORRECT | 0 | 0 | 0 | 1 | 1 |

SEMICONDUCTOR MEMORY DEVICE AND ERROR CORRECTION METHOD THEREOF

BACKGROUND OF THE INVENTION

1. Field of the Invention

The present invention relates to a semiconductor memory device such as a DRAM (Dynamic Random Access Memory) and, more particularly, to the technical field of a semiconductor memory device which is designed to generate and store check codes in a row direction and a column direction of a storage area to perform error detection/correction by using the check codes and an error correction method thereof.

2. Related Art

In order to realize a further reduction in power consumption in a data holding state of a DRAM, a refresh operation is required to be controlled in a period longer than a period in a normal operation. For this reason, a configuration which is equipped with an error correction function achieved by an ECC circuit or the like to make it possible to correct bit errors which is increased in number by elongating the period of the refresh operation is proposed. For example, a semiconductor integrated circuit device disclosed in Japanese Patent Laid-Open Application No. 2002-56671 is a typical configuration.

The semiconductor integrated circuit device disclosed in Japanese Patent Laid-Open Application No. 2002-56671 includes a means to hold check bits for error detection/correction, a means to generate check bits from a number of data, and a means to correct error bits by using check bits. The semiconductor integrated circuit has a configuration which generates and stores check bits in a change to a data holding state. This configuration makes it possible to elongate the period of a refresh operation, and low power consumption in the data holding state can be achieved.

However, with the conventional configuration, when bit errors increase in number beyond the bounds of permissibility, an error pattern the error of which cannot be corrected often occurs. For example, according to a general error correction circuit applied to a DRAM, only an error of 1 bit which is generated in a bit string in a row or column direction can be corrected. However, an error of two or more bits which is generated in the row or column direction cannot be corrected. On the other hand, the configuration of an error correction circuit which can correct an error of two or more generated in a bit string may also be employed as an error correction circuit. However, such an error correction circuit increases in circuit scale to increase the cost. Therefore, in the conventional configuration, a refresh period must be limited to a specific period to suppress an error occurrence rate within an error-correctable range. The low power consumption cannot be achieved without any problem.

BRIEF SUMMARY OF THE INVENTION

It is an object of the present invention to provide a semiconductor memory device which can expand a permissible range of bit errors that increase in number in a DRAM with a general error correction circuit, further elongate a refresh period, and achieve lower power consumption.

A semiconductor memory device according to an aspect of the present invention, comprising: a memory array having a data area in which data is stored and a check code area in which a check code for error detection/correction of said data is stored; refresh control means which controls a refresh operation of said memory array in a data holding state using a predetermined period; operation means which executes an encoding operation for generating said check code using a bit string in said data area as a processing unit, and executes a decoding operation for performing said error detection/correction of said data using said check code; encode control means for controlling an encode process in which in a change to said data holding state, in a first direction and a second direction orthogonal to each other in said memory array, a first code generated by said operation means on the basis of said bit string in said first direction and a second code generated by said operation means on the basis of said bit string in said second direction are written in said check code area in a distinguishable manner; and decode control means for controlling a decode process in which at the end of said data holding state, first bit error correction based on said first code in said first direction and second bit error correction based on said second code in said second direction are alternately performed by said operation means, and said first bit error correction and said second bit error correction are performed at least twice respectively.

According to the aspect of the present invention, the encode process is executed in a change to the data holding state accompanying the refresh operation, and the decode process is executed at the end of the data holding state. In the encode process, bit strings having direction orthogonal to each other are used as units of the encoding operation. In the decode process, bit error correction is alternately performed in two directions orthogonal to each other. Thus, even using a coding algorithm which can correct only one bit, bit errors are gradually corrected by increasing the number of operations. Therefore, bit errors are reduced in number without using a complex encoding algorithm to make it possible to elongate a refresh period, and the power consumption of the semiconductor memory device can be reduced.

In the semiconductor memory device of the present invention, it is possible that said operation means outputs a first signal representing that an error of at least one bit is generated in a bit string to be decoded and a second signal representing a bit position at which only a 1-bit error is generated in said bit string.

In the semiconductor memory device of the present invention, it is possible that said decode control means determines that an uncorrectable bit error is present in a bit string to be decoded in the case that in said second bit error correction said first signal is output and said second signal is not output.

In the semiconductor memory device of the present invention, it is possible that when said decode control means determines that said uncorrectable bit error is present in said bit string to be decoded, position information of said bit string is held, and said second bit error correction is performed to said bit string of said held position information in subsequent said second bit error correction In the semiconductor memory device of the present invention, it is possible that said decode control means controls such that said first bit error correction and said second bit error correction are performed a predetermined number of times, respectively.

In the semiconductor memory device of the present invention, it is possible that said first direction is a row direction of said memory array, and said second direction is a column direction of said memory array.

In the semiconductor memory device of the present invention, further comprising mode control means which controls changing of a normal operation mode in which an operation in normal state is controlled and a low-power-consumption mode in which an operation is controlled to reduce power consumption in said data holding state, wherein said refresh control means controls said refresh operation using a long period in said low-power-consumption mode.

An error correction method for a semiconductor memory according to an aspect of the present invention, having a memory area constituted by a data area in which data is stored and a check code area in which a check code for error detection/correction of said data is stored, comprising; performing an operation which executes an encoding operation for generating said check code using a bit string in said data area as a processing unit, and executes a decoding operation for performing said error detection/correction of said data using said check code; controlling an encode process in which in a change to said data holding state, in a first direction and a second direction orthogonal to each other in said memory array, a first code generated by said operation on the basis of said bit string in said first direction and a second code generated by said operation on the basis of said bit string in said second direction are written in said check code area in a distinguishable manner; and controlling a decode process in which at the end of said data holding state, first bit error correction based on said first code in said first direction and second bit error correction based on said second code in said second direction are alternately performed by said operation, and said first bit error correction and said second bit error correction are performed at least twice respectively.

In the error correction method for a semiconductor memory of the present invention, it is possible that when in said decode process an uncorrectable bit error is present in a bit string to be decoded, position information of said bit string is held, and said second bit error correction is performed to said bit string of said held position information in subsequent said second bit error correction.

In the error correction method for a semiconductor memory of the present invention, it is possible that said first bit error correction and said second bit error correction are performed a predetermined number of times, respectively.

According to the present invention, the first code and the second code are generated with respect to two directions of the memory array in the encode process, and bit error corrections using the first code and the second code are alternately performed in the decode process. Accordingly, the procedure is devised by using the general error correction function, the permissible range when bit errors increase in number is expanded. The refresh period is more elongated to make it possible to realize low power consumption of the semiconductor memory device.

BRIEF DESCRIPTION OF THE DRAWINGS

FIG. 3 is a diagram showing types of main memory control commands used in the DRAM according to the embodiment;
FIG. 10 is a diagram showing types of codec control commands.

DETAILED DESCRIPTION OF THE INVENTION

A preferable embodiment of the present invention will be described below with reference to the accompanying drawings. In the embodiment, a case in which the present invention is applied to a DRAM which includes a built-in circuit having an error correction function and controls a refresh operation in a long period to realize low power consumption will be described below.

Figure 1:
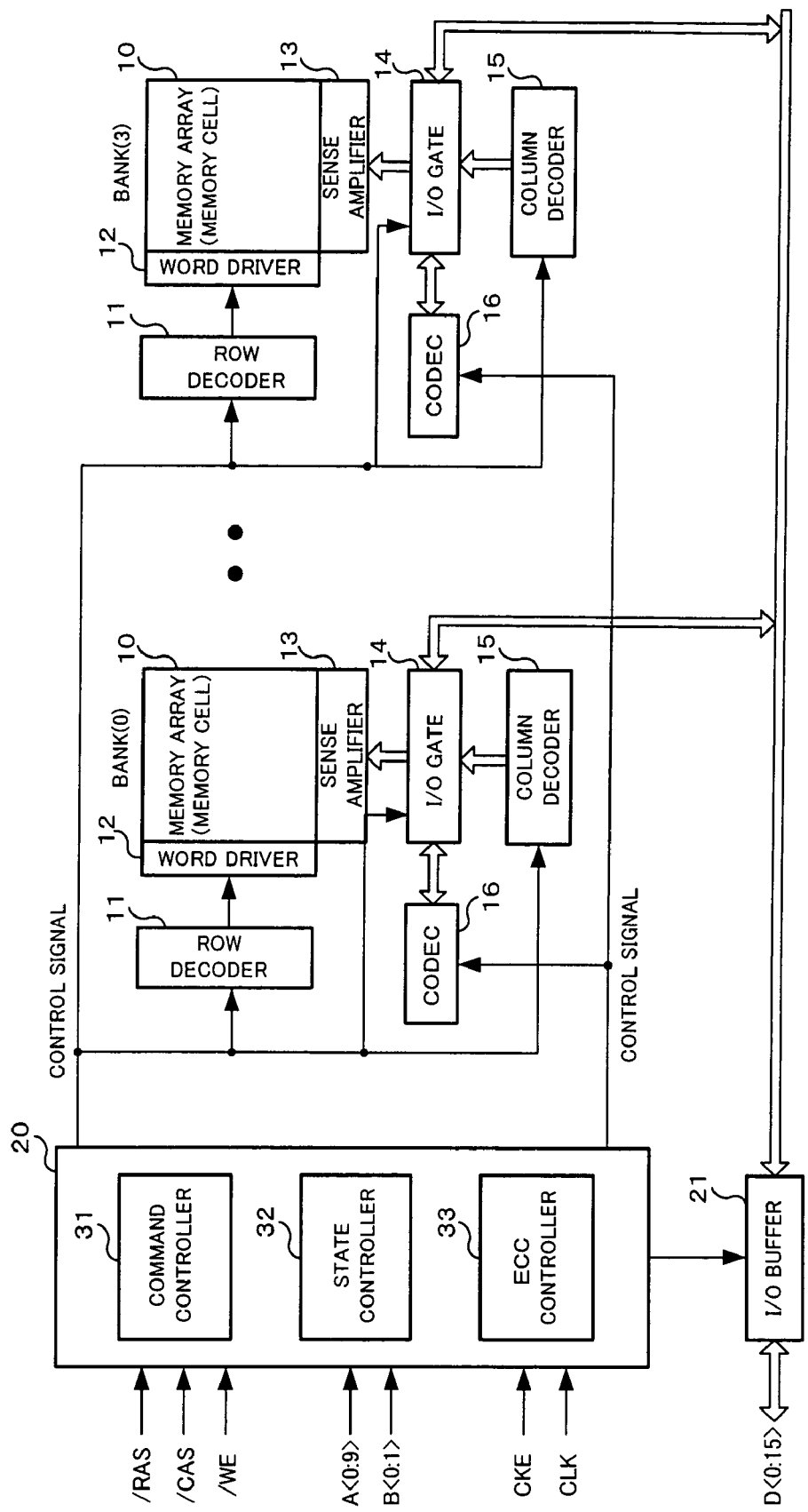
FIG. 1 is a block diagram showing an entire configuration of the DRAM according to the embodiment.

FIG. 1 is a block diagram showing an entire configuration of a DRAM according to the embodiment. A DRAM having a 4-bank configuration and a memory capacity of 64 Mbits will be exemplified. The DRAM shown in FIG. 1 includes four memory arrays 10 corresponding to four banks 0 to 3, a row decoder 11, a word driver 12, a sense amplifier 13, an I/O gate 14, a column decoder 15, and a codec 16 which are provided around each memory array 10. The DRAM further includes a control circuit 20 and an I/O buffer 21.

In the above configuration, each memory array 10 has a data area arranged in the form of a matrix in a row direction and a column direction, and a check code area which stores check bit strings (check codes) corresponding to the data area. An error correction function based on the check code will be described later. The four memory arrays 10 corresponding to the four banks 0 to 3 have the same configuration respectively. The row decoder 11, the word driver 12, the sense amplifier 13, the I/O gate 14, the column decoder 15, and the codec 16 which are arranged around the memory arrays 10 have the same configurations for the four banks 0 to 3.

To the memory array 10, a desired row address and a desired column address to be accessed are designated on the basis of memory control commands which instruct operation. The row decoder 11 selects one word line (not shown) corresponding to the row address to be designated. The word driver 12 drives the word line selected by the row decoder 11 to a selection level.

On the other hand, the sense amplifier 13 amplifies a voltage difference generated on complementary bit lines in response to read data from memory cells connected to the word line driven to the selection level and outputs the amplified voltage difference to the I/O gate 14. The column decoder 15 selects a column corresponding to the column address designated as described above, and data of the selected column is transmitted from the I/O gate 14 to the I/O buffer 21. In access to the memory array 10, the I/O buffer 21 functions as a buffer which inputs or outputs 16-bit data D <0:15> between an external circuit and the I/O gate 14.

Figure 2:
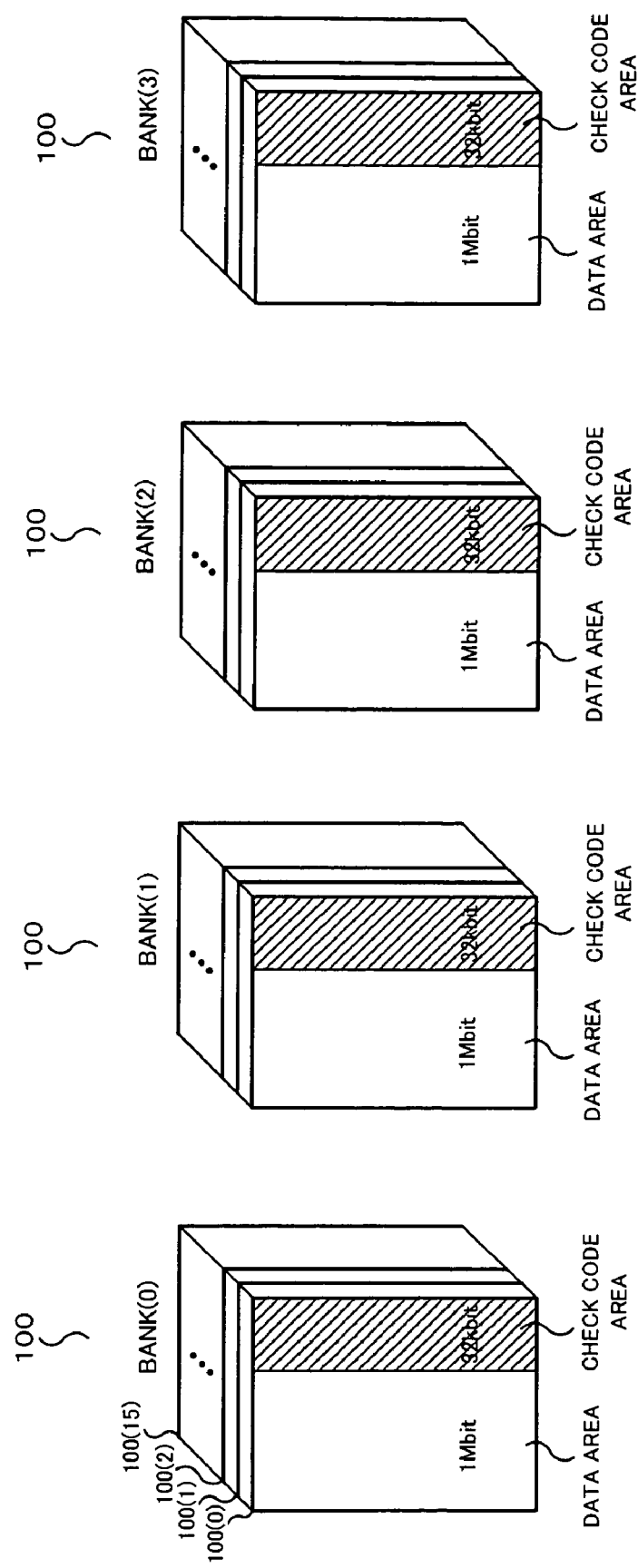
FIG. 2 is a diagram showing a configuration of banks and mats of a memory array.

As shown in FIG. 2, each memory array 10 corresponding to the four banks 0 to 3 is constituted by 16 mats 100. More specifically, as shown in a depth direction in FIG. 2 such that the mats 100 are stacked, the memory array 10 is constituted by the 16 mats 100(0) to 100(15). When the memory array 10 is accessed, read access or write access are simultaneously performed to the 16 mats 100(0) to 100(15). Each of the mats 100 is constituted by a data area having a 1024×1024 bit configuration and a check code area having a 32×1024 bit configuration. The check code area in which check codes as error correction codes are stored is recognized as an address space which is different from the data area.

The check code to be stored in the check code area is generated by the codec 16 and is used for error correction by the codec 16. However, a concrete operation of the check code will be described later.

In the configuration in FIG. 2, the four banks 0 to 3 have the same configurations, respectively. Thus, each bank has a memory capacity of 16 M (1 M×16) bits with respect to the data area, and the DRAM has a storage capacity of 64 M (16 M×4) bits as a whole. The four banks 0 to 3 in FIG. 2 are designed such that any one of the four banks can be selected based on a 2-bit bank selection signal.

Returning to FIG. 1, the control circuit 20 controls various operations of the DRAM according to the embodiment to control the internal timings of the constituent elements in FIG. 1. The control circuit 20 includes command controller 31 which detects a memory control command to the DRAM, a state controller 32 which controls switching of operation states of the DRAM, and an ECC (Error Correcting Code) controller 33 which controls an error correction function using the check code described above.

To the control circuit 20, as external control signals, a row address strobe signal (/RAS), a column address strobe signal (/CAS), a write enable signal (/WE), a clock enable signal CKE, and a clock signal CLK are supplied (Note that symbol/means that a signal becomes active at low level).

Also to the control circuit 20, a 10-bit address signal A <0:9> and a 2-bit bank selection signal B <0:1> are input.

The command controller 31 of the control circuit 20 detects a memory control command determined by a combination pattern of externally input control signals to output a necessary control signal. FIG. 3 is a diagram showing types of main memory control commands used in the DRAM according to the embodiment. An Entry command and an Exit command of the control commands shown in FIG. 3 are decided by the state controller 32 (will be described later).

An ACT command selects a bank designated by a bank selection signal and selects a row address based on an address signal to set an active state. An RD command selects a column address based on the address signal on the selected row address and reads data stored in the memory array 10. A WT command selects a column address based on the address signal on the selected row address and writes data to the memory array 10. An REF command executes a refresh operation to hold electric charges accumulated in the capacitor of each memory cell of the memory array 10. A PRE command precharges the selected bank after the data of the selected row address is read.

The state controller 32 of the control circuit 20 detects the Entry command and the Exit command based on a combination pattern of the control signals in FIG. 3 prior to a switching operation of two modes set in the embodiment. More specifically, in the embodiment, there are two modes, i.e., a normal operation mode in which an operation in a normal state is controlled and a low-power-consumption mode in which an operation is controlled to reduce a power consumption in the data holding state of the DRAM. As shown in FIG. 3, the Entry command changes the operation state of the DRAM operating in the normal operation mode to the low-power-consumption mode. The Exit command changes the operation state of the DRAM operating in the low-power-consumption mode to the normal operation mode. In the low-power-consumption mode, a refresh operation is performed to the DRAM of the embodiment in a long period while performing error correction to realize low power consumption.

Figure 4:
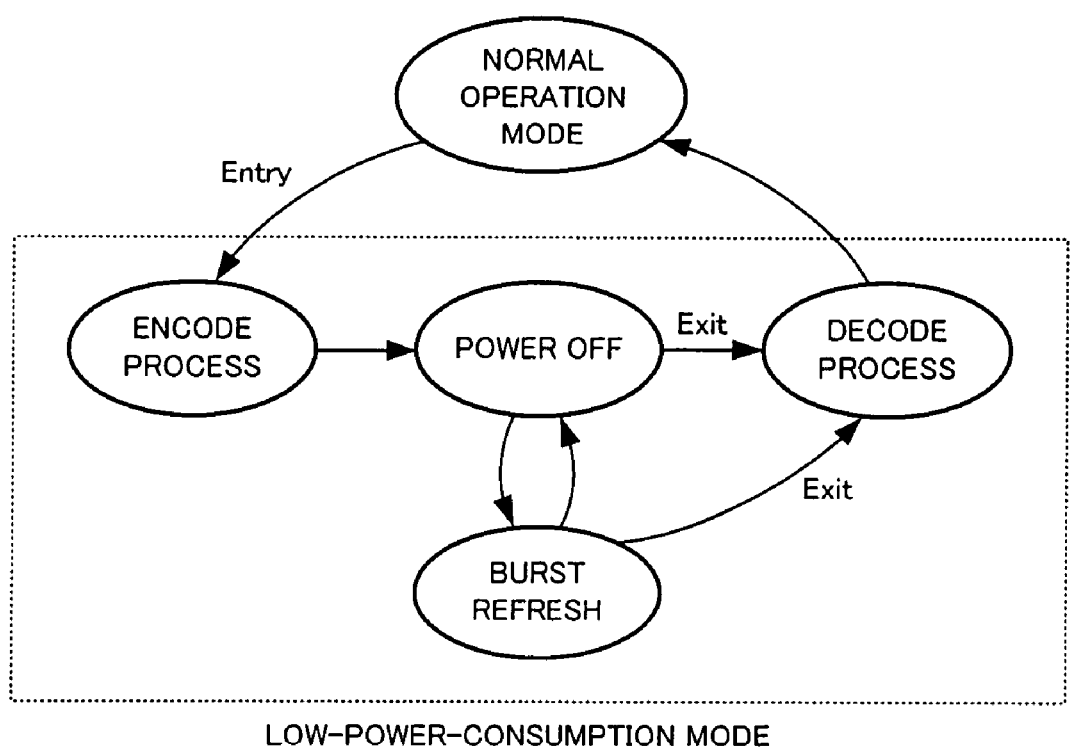
FIG. 4 is a state change diagram for explaining a number of operation states and functions of the DRAM.
Figure 5:
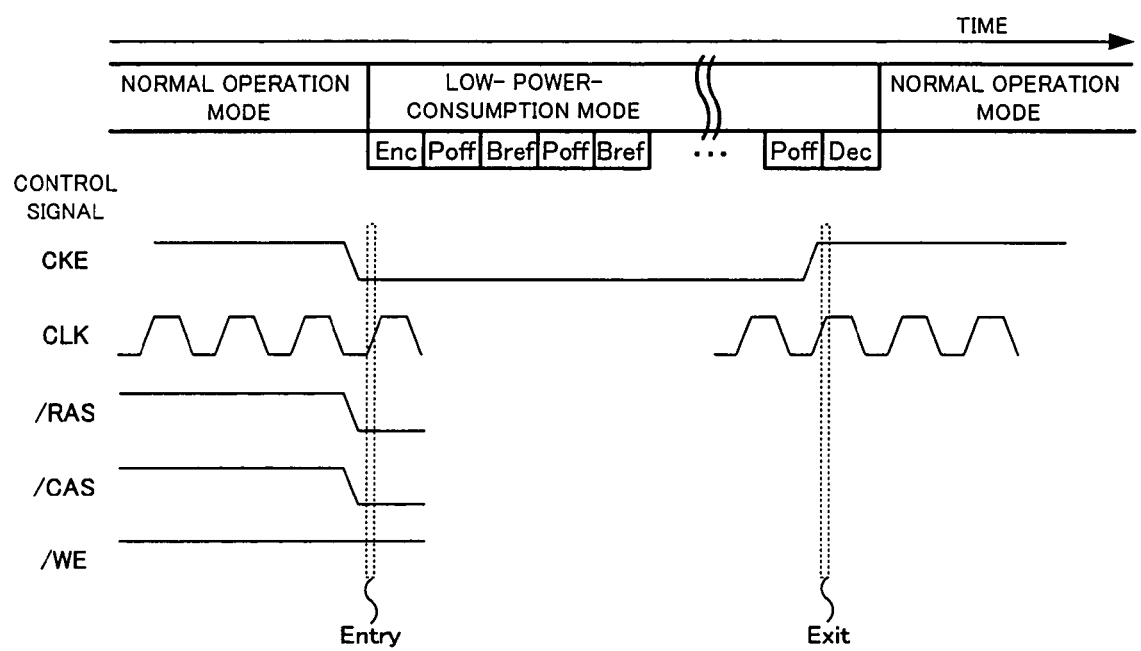
FIG. 5 is a timing flow chart of an outline corresponding to the state change diagram in FIG. 4.

The operation state of the DRAM will be described below with reference to FIGS. 4 and 5. FIG. 4 is a state change diagram for explaining a number of operation states and functions of the DRAM, and FIG. 5 is a timing flow chart of an outline corresponding to the state change diagram in FIG. 4. In FIG. 4, the operation state of the DRAM is divided into two modes, i.e., a normal operation mode and a low-power-consumption mode. The low-power-consumption mode includes four states (processes), i.e., an encode process, a power-off state, a burst refresh process, and a decode process.

When the Entry command is input in the normal operation mode, the encode process in the low-power-consumption mode is started. At this time, as shown in FIG. 5, in the normal operation mode, a control signal changes on the basis of a combination pattern of the Entry command in FIG. 3. At this timing, the normal operation mode is switched to the low-power-consumption mode. In the example in FIG. 5, after the encode process (Enc) is performed first, a power-off state (Poff) and a burst refresh (Bref) are alternately repeated, and a decode process (Dec) is finally performed. Although is not described in detail, the burst refresh (Bref) and the decode process (Dec) are performed after the DRAM is powered on.

In the encode process, an encoding operation which generates a check code (first code) in a row direction based on a bit string of each row of the memory array 10 and a check code (second code) in a column direction based on a bit string of each column of the memory array 10 is executed, and the first code and the second code are written in the check code area. Upon completion of the generation of the check codes by the encode process, the state is changed into the power-off state to stop all unnecessary power supplies of the DRAM. The burst refresh process is started after a predetermined elapsed time.

In the burst refresh process, a continuous refresh operation is performed to all the data areas and all the check code areas of the memory array 10. In the refresh operation, a refresh counter (not shown) generates a row address of the memory array 10 to sequentially count up the row address.

Subsequent to the burst refresh process, the state changes into the power-off state again, the power-off state changes into the burst refresh process again after a predetermined elapsed time. Subsequently, the burst refresh process and the power-off state are alternately repeated. In this case, in the low-power-consumption mode, an interval (period) between adjacent burst refresh processes is set in advance. For example, a long interval of about one second is set.

On the other hand, in the power-off state or the burst refresh process, when the Exit command is input, the power-off state or the burst refresh process changes into a decode process. At this time, a control signal changes on the basis of a combination pattern of the Exit command in FIG. 3, and the decode process is started at this timing. The decode process executes a decoding operation using the data and the check codes of the memory array 10 on the basis of a check code generated by the encode process, and corrects a 1-bit error generated in the row or column direction of the memory array 10.

Upon completion of the decode process, the mode automatically changes into the normal operation mode, and the normal operation mode continues until the Entry command is input again. As time for continuing the low-power-consumption mode, arbitrary time depending on control of the DRAM can be set. In the low-power-consumption mode, since the time of the power-off state is relatively longer than time required for the burst refresh process, power consumption can be made considerably smaller than that in the normal operation mode.

Figure 6:
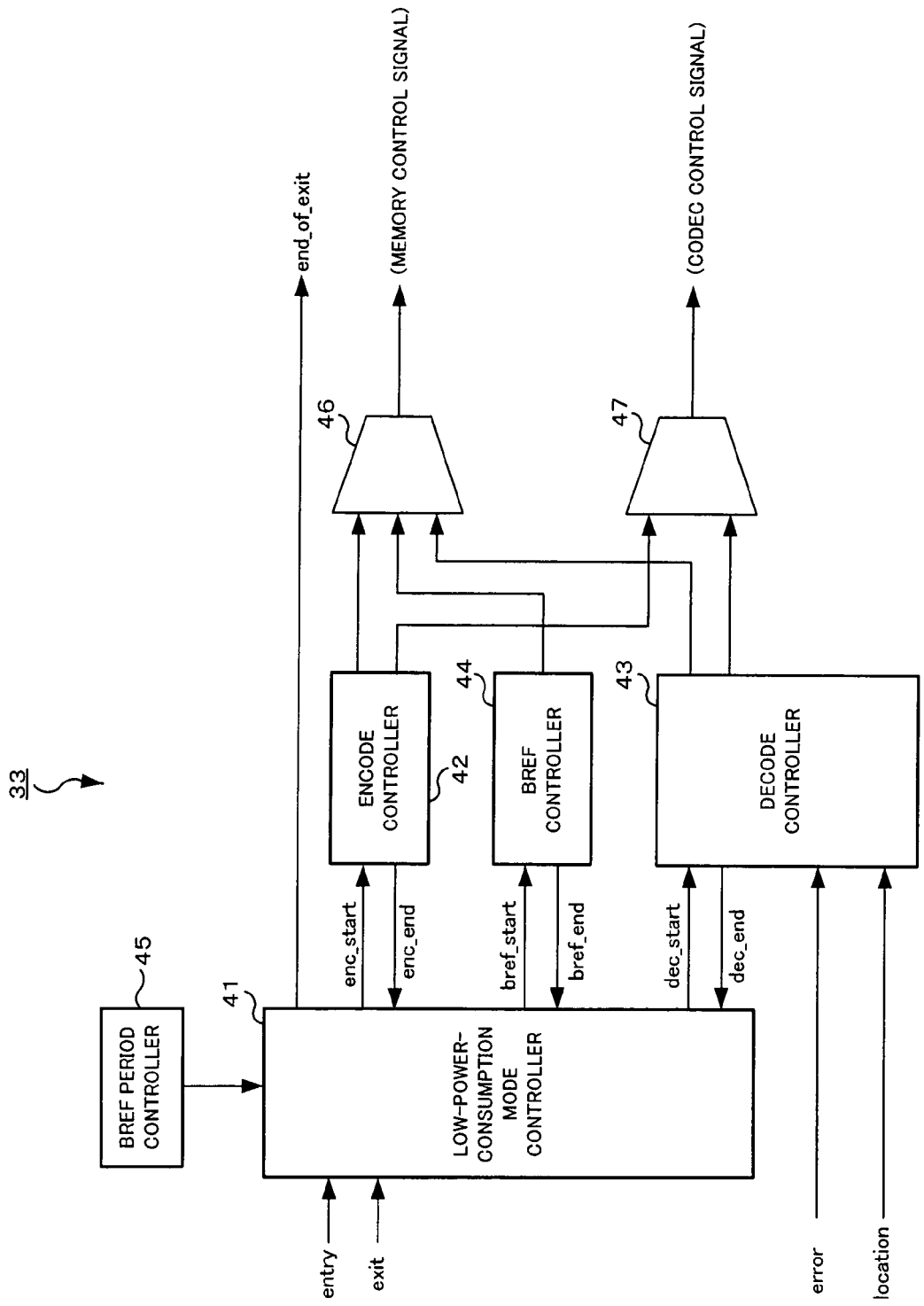
FIG. 6 is a block diagram showing the configuration of the ECC controller of the control circuit.

FIG. 6 is a block diagram showing the configuration of the ECC controller 33 of the control circuit 20. As shown in FIG. 6, the control circuit 20 includes a low-power-consumption mode controller 41 which controls an entire operation in the low-power-consumption mode, an encode controller 42 which controls an encode process, a decode controller 43 which controls a decode process, a BREF controller 44 which controls a burst refresh process, a BREF period controller 45 which controls a period of the burst refresh process, and multiplexers 46 and 47 which selectively switch signals to be externally output.

A detect signal of the Entry command and the Exit command is input from the state controller 32 to the low-power-consumption mode controller 41, and control is performed depending on each command. The low-power-consumption mode controller 41 supplies signals enc_start, dec_start, and bref_start to the encode controller 42, the decode controller 43, and the BREF controller 44 at corresponding control start timings, respectively. The low-power-consumption mode controller 41 receives signals enc_end, dec_end, and bref end from the encode controller 42, the decode controller 43, and the BREF controller 44 at corresponding control end timings, respectively. When the low-power-consumption mode is ended, the low-power-consumption mode controller 41 outputs a signal end_of_exit.

The encode controller 42 controls an encoding operation performed by the codec 16 attached to each memory array 10 in execution of the encode process. The decode controller 43 controls a decoding operation performed by the codec 16 in execution of the decode process. On the other hand, the BREF controller 44 controls the operations of each memory array 10 when the burst refresh process is controlled. At this time, the burst refresh process is controlled by the BREF period controller 45 serving as a timer which measures a predetermined period.

Control signals output from the encode controller 42, the decode controller 43, and the BREF controller 44 are input to the two multiplexers 46 and 47. Signals which control the operations of the memory array 10 are input to the multiplexer 46. The signals are selectively switched and output as a memory control signal. Signals which control the operations of the codec 16 are input to the multiplexer 47. The signals are selectively switched and output as codec control signals.

Figure 7:
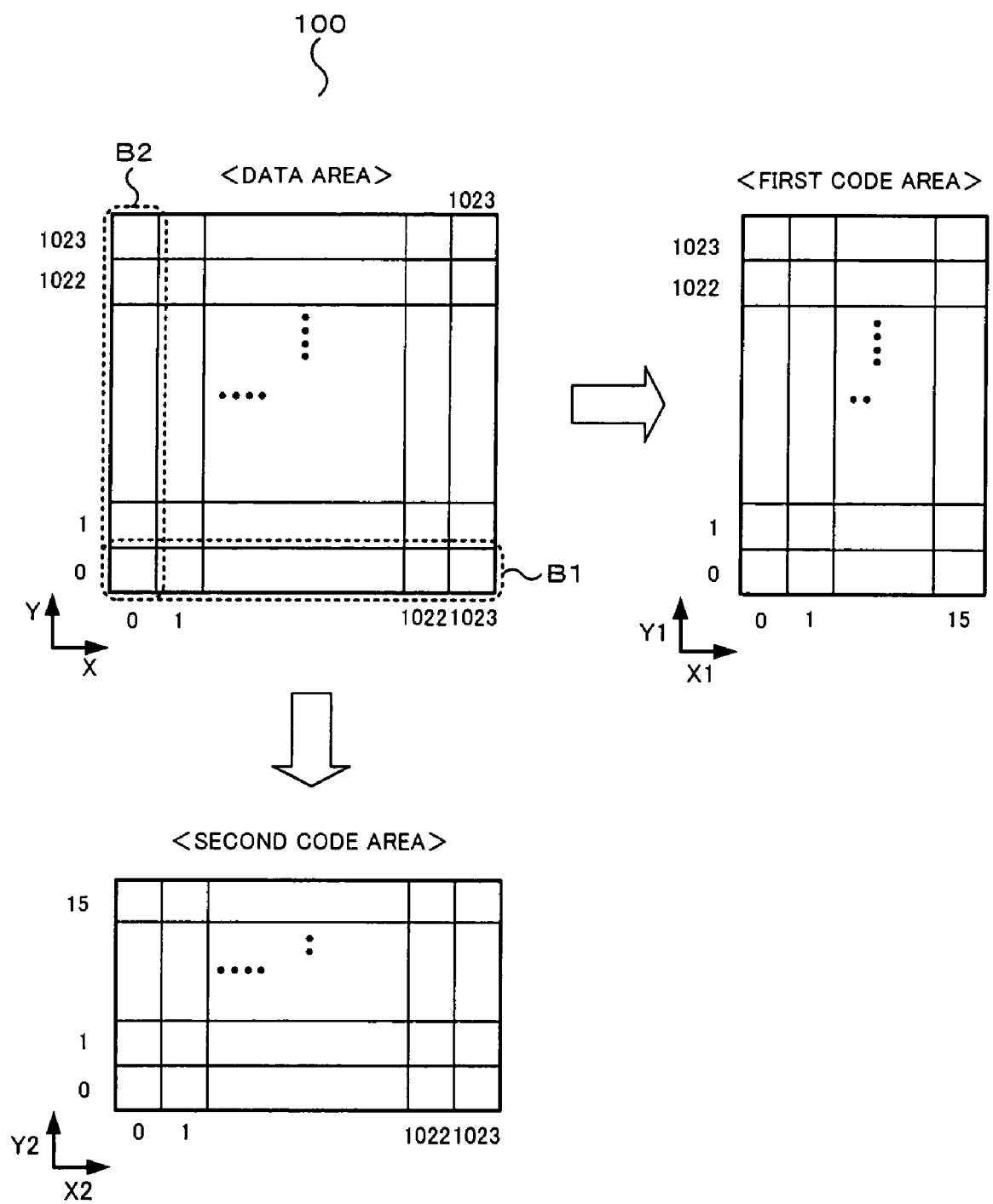
FIG. 7 is a diagram showing a configuration of a check code generated in the encode process.

FIG. 7 is a diagram showing the configuration of a check code generated in the encode process. FIG. 7 shows one of the mats 100 constituting the memory array 10. In the data area of the mat 100, bit positions are specified by (X,Y), a matrix of 1024×1024 bits in which X and Y change in the range of 0 to 1023 is formed. Check codes of the mat 100 are shown by a first code system in which division is performed by using 1024 bits in the X direction as a processing unit and a second code system in which division is performed by using 1024 bits in the Y direction as a processing unit.

An check code (first code) generated on the basis of the first code system is written in a first code area. On the other hand, a check code (second code) generated on the basis of the second code system is written in a second code area. The first code area and the second code area, as shown in FIG. 7, have a memory capacity of 16×1024 bits to one mat 100, and constitute a check code area of 32×1024 bits as a whole. However, if the first code and the second code are distinguishable from each other, the first and second codes can be arbitrarily arranged in the check code area.

In the data area, bit positions are expressed by (X,Y), in order to differentiate the bit positions, bit positions in the first code area are expressed by (X1,Y1), and bit positions in the second code area are expressed by (X2,Y2).

As shown in FIG. 7, in the data area of the mat 100, a first box B1 is defined along the X direction. The first box B1 is constituted by bit strings each having 1024 bits divided by the first code system to form a unit of the encode process in the X direction to the data area of the mat 100. In FIG. 7, one first box B1 at a position expressed by Y=0 is shown. In fact, according to the encode process, 1024 first boxes B1 are sequentially set at positions expressed by Y=0 to Y=1023. An check code generated to the first box B1 at a position expressed by Y=n is written in 16 bits (X1=0 to 15) at the position expressed by Y1=n in the first code area.

As shown in FIG. 7, a second box B2 is defined along the Y direction in the data area of the mat 100. The second box B2 is constituted by 1024 bits divided by the second code system to form a unit of the encode process in the Y direction in the data area of the mat 100. In FIG. 7, one second box B2 at a position expressed by X=0 is shown. In fact, according to the encode process, 1024 second boxes B2 are sequentially set at positions expressed by X=0 to X=1023. In this case, a check code generated to the second box B2 at a position expressed by X=n is written in 16 bits (Y2=0 to 15) at the position expressed by X2=n in the second code area.

Figure 8:
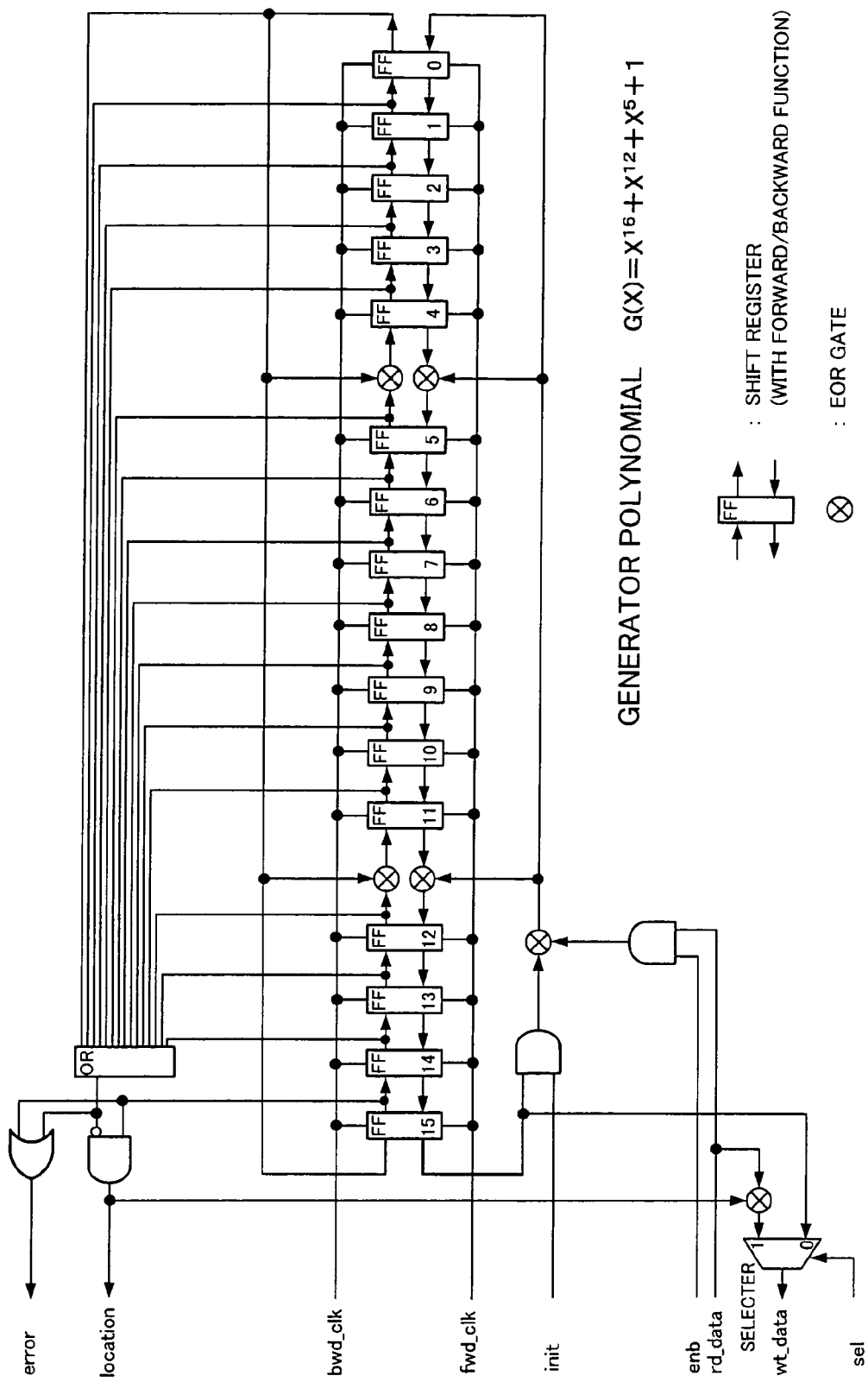
FIG. 8 is a diagram showing an example of a circuit configuration of the codec.

Next, the configuration and operations of the codec 16 (FIG. 1) functioning as an operation means of the present invention will be described below. FIG. 8 is a diagram showing an example of a circuit configuration of the codec 16. FIG. 8 shows an example of the codec 16 which calculates generator polynomial $G(x)=x^{16}+x^{12}+x^5+1$ on the basis of cyclic Hamming code. The codec 16 includes a 16-stage shift register and a peripheral logic circuit. The 16-stage shift register has a forward/backward function. When a forward clock fwd_clk is input to the 16-stage shift register, data is sequentially transferred from the right to the left (forward direction) in FIG. 8. When a backward clock bwd_clk is input to the 16-stage shift register, data is sequentially transferred from the left to the right (backward direction) in FIG. 8.

Figure 9:
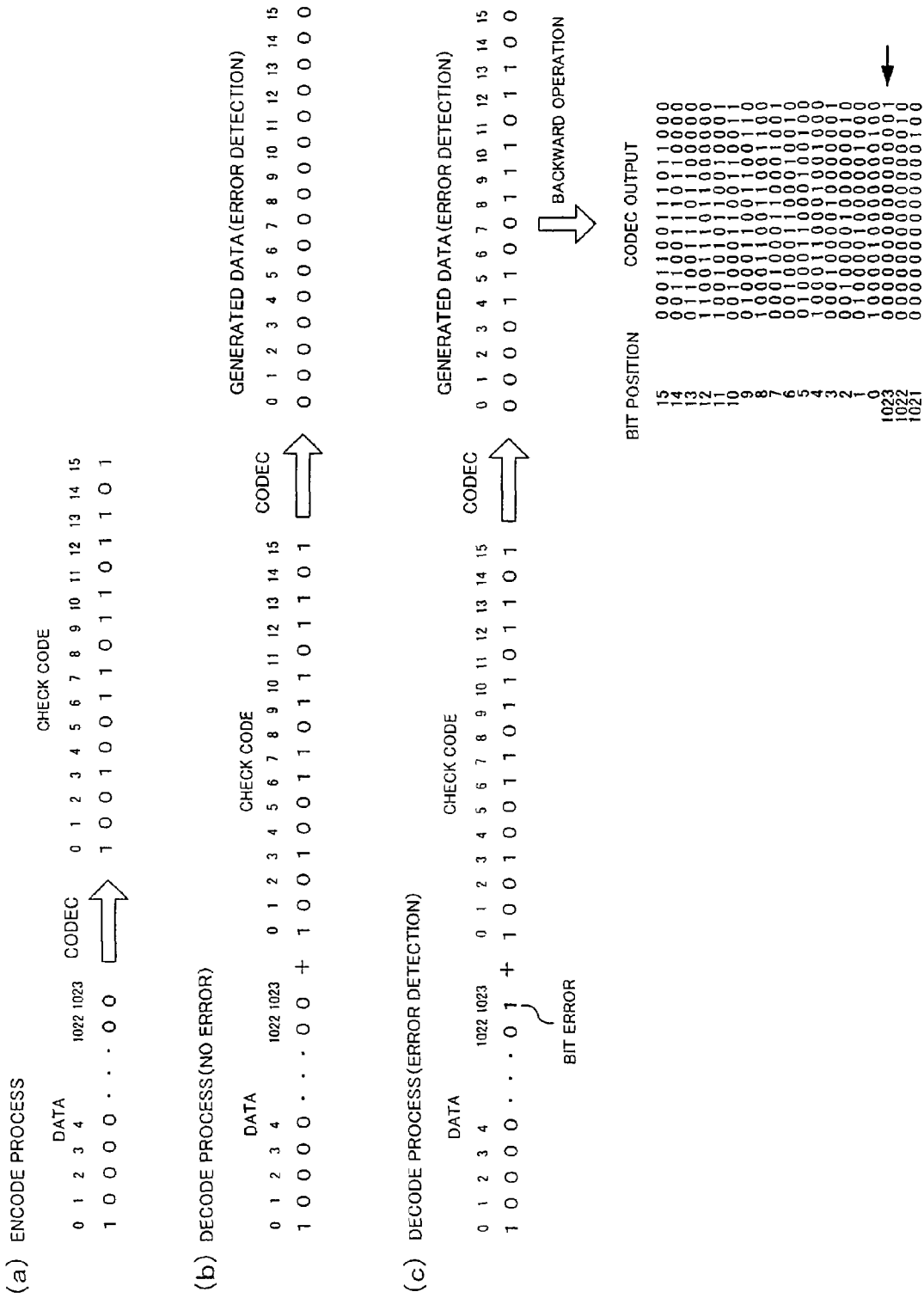
FIG. 9 is a diagram showing a concrete example of check code generation in the encode process of the codec.

A concrete example of an operation process in the codec 16 having the configuration in FIG. 8 will be described below by using FIG. 9. The upper section in FIG. 9 shows a concrete example of check code generation in the encode process of the codec 16. When a check code is generated, 1024-bit data is loaded to a shift register bit by bit. The shift register is shifted in the forward direction, and a check code is generated in the 16-stage shift register when all the bits are completely loaded. In the example of the encode process in FIG. 9, a check code obtained when data including the top bit of 1 and the other bits of 0 is input is shown. The check code generated as described above is written at a predetermined position according to the first code system or the second code system in the check code area of the memory array 10.

In the middle section in FIG. 9, a concrete example obtained when no bit errors are generated in a decode process of the codec 16. In the decode process at this case, the 1024 bits and the 16 bits of the check code, i.e., total 1040 bits are loaded to the shift register bit by bit. The shift register is shifted in the forward direction, and all the bits of the 16-stage shift register become 0 upon completion of the loading. At this time, an error signal output from the codec 16 becomes 0.

In the lower section in FIG. 9, a concrete example obtained when a bit error is generated in a decode process of the codec 16. In the decode process at this case, above-mentioned total 1040 bits of the data and the check code are loaded to the shift register bit by bit. In this case, upon completion of the loading, the 16-stage shift register includes not only a bit of 0 but also a bit of 1. At this time, the error signal output from the codec 16 becomes 1. When a 1-bit error is generated, the shift register of the codec 16 is shifted in the backward direction to change a location signal into 1 at a bit position where an error occurs.

At the lower right in FIG. 9, one example of a change in output pattern when the codec 16 is reversed is shown. Since a bit of 1 is generated in an output from the shift register corresponding to a position of bit 1023, it can be determined that the bit 1023 has an error. However, when the 1024 bits include a 1-bit error, the error can be detected. However, when the 1024 bits include a 2-bit error, even though the shift register is shifted in the backward direction, the positions of the error bits cannot be detected.

Next, codec control commands used in operation control of the codec 16 will be described below. FIG. 10 is a diagram showing types of codec control commands. These codec control commands are determined by a combination pattern of control signals input to the codec 16, and are mainly output from the encode controller 42 and the decode controller 43 of the ECC controller 33 to the codec 16.

In FIG. 10, a GEN_CODE command is a command to input bits read from the data area to the codec 16 as an object of an encoding operation. A WT_CODE command is a command to transfer a check code generated by the codec 16 to the memory array 10 bit by bit. A REVERSE command is a command to set a backward clock bwd_clk as 1 and to start shift of the shift register of the codec 16 in the backward direction. A CORRECT command is a command to invert a bit at which an error is generated in the codec 16 and to output the corrected bits.

Figure 11:
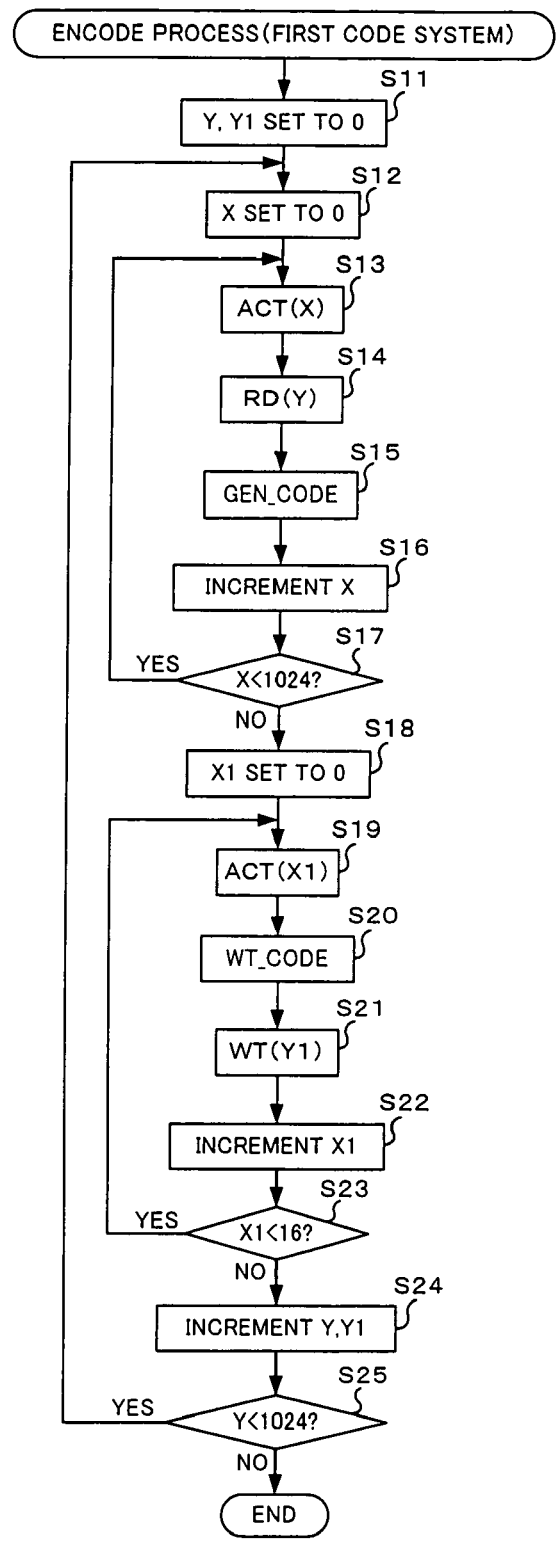
FIG. 11 is a control flow showing a process based on the first code system in the encode process.
Figure 12:
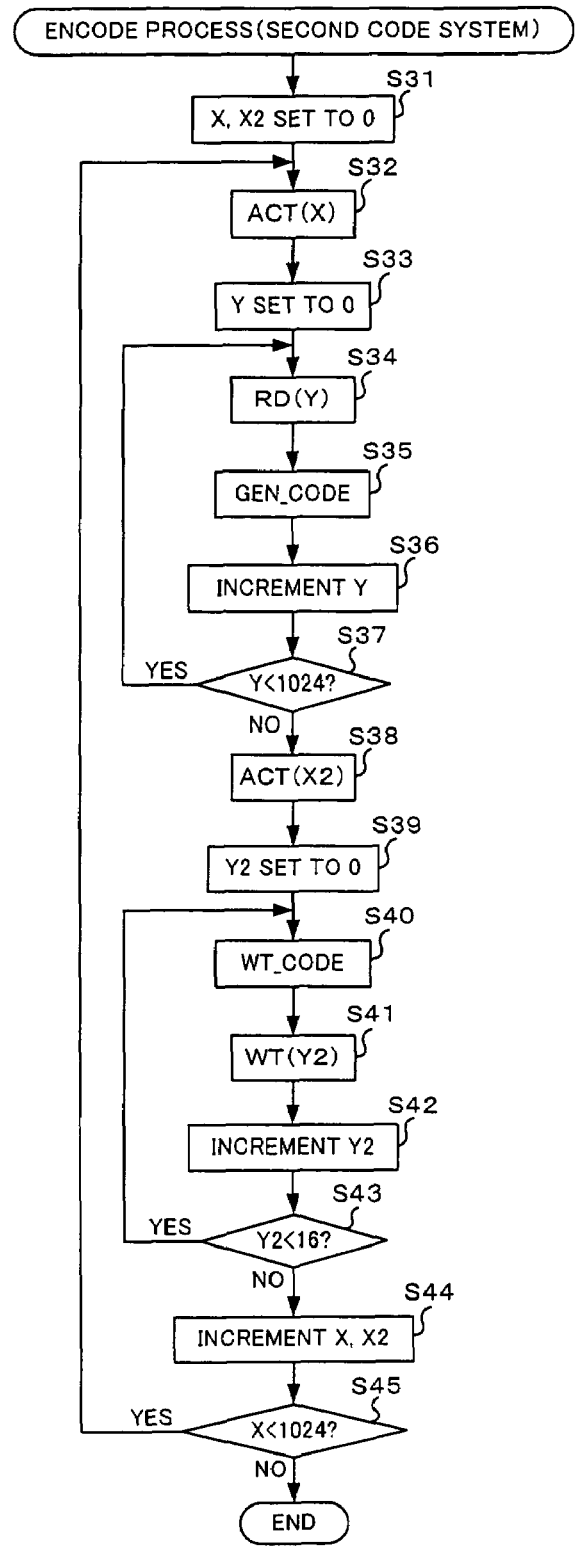
FIG. 12 is a control flow showing a process based on the second code system in the encode process.
Figure 13A:
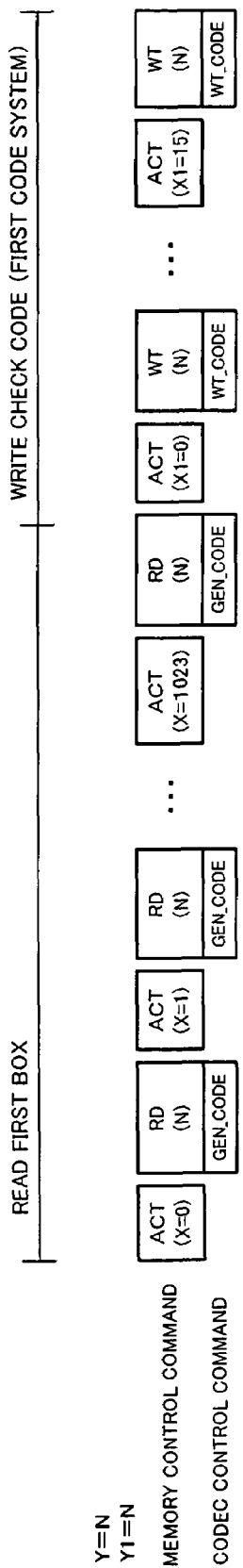
FIG. 13A is a timing chart corresponding to the control flow in FIG. 11 related to an arbitrary row given by Y=N and Y1=N in the data area.
Figure 13B:
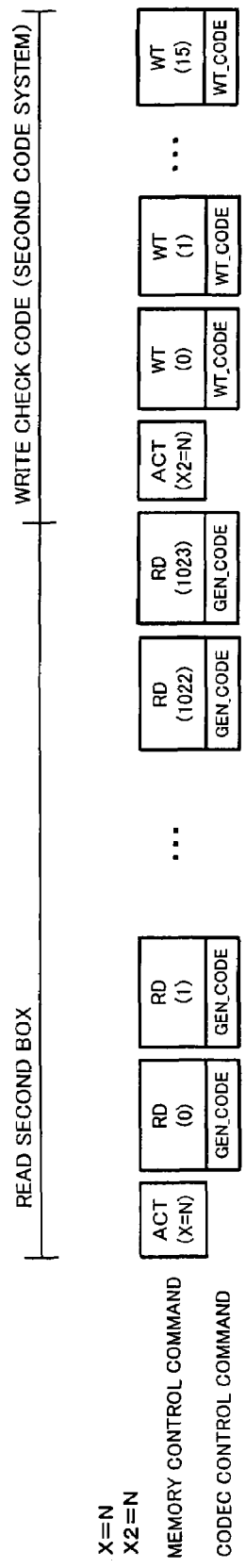
FIG. 13B is a timing chart corresponding to the control flow in FIG. 12 related to an arbitrary row given by Y=N and Y1=N in the data area.

Concrete control procedures of an encode process and a decode process in the DRAM according to the embodiment will be described below. The control procedure of the encode process will be described first. This encode process is mainly controlled by the encode controller 42 (FIG. 6). FIGS. 11 and 12 are flow charts showing a control flow of the encode process, and FIGS. 13A and 13B are a timing charts corresponding to the control flow in FIGS. 11 and 12.

FIG. 11 is a control flow showing a process based on the first code system in the encode process. When the control shown in FIG. 11 is started, a column address Y in the data area and a column address Y1 in the first code area are set to 0 respectively (step S11). Subsequently, a row address X in the data area is set to 0 (step S12). In this embodiment, since the mat 100 having 1024×1024 bits is assumed, as will be described below, X and Y are counted up within the range of 0 to 1023 to make it possible to access all the bit positions in the data area.

Then, a memory control command ACT (X) is executed (step S13), and a row address X is selected to set an active state. Subsequently, a memory control command RD (Y) is executed (step S14), and a bit at position (X,Y) in the data area is read. On the other hand, with execution of the command RD (Y), a codec control command GEN_CODE is executed (step S15). In this manner, a bit at position (X,Y) in the data area is input as an object to be operated to the codec 16.

Then X is incremented (step S16), control in steps S13 to S17 is repeated until the value of X reaches 1024 (step S17). As a result, an encoding operation using 1024 bits in the first box B1 is completed. At this time, the shift register of the codec 16 is set in a state in which a 16-bit check code corresponding to the first box B1 is generated.

A row address X1 in the first code area is set to 0 (step S18). A memory control command ACT (X1) is executed (step S19), and a row address X1 is selected to set an active state. Subsequently, a codec control command WT_CODE is executed (step S20), a predetermined check bit generated by the codec 16 is transferred to the memory array 10. A control command WT (Y1) is executed (step S21), and a check bit based on the first code system is written at position (X1,Y1) in the first code area.

Then, X1 is incremented (step S22), control in steps S19 to S23 is repeated until the value of X reaches 16 (step S23). As a result, writing of a 16-bit check code based on the first code system in the first code area is completed.

Next, Y and Y1 are incremented to update column addresses in the data area and the first code area (step S24). Control in steps S12 to S25 is repeated until the value of Y reaches 1024 (step S25). In step S25, the same decision is made to Y1. In this manner, the same encode process is repeated to the first box B1 of 1024 rows when the value of Y ranges from 0 to 1023. At this time, generation and writing of the check code based on the first code system are completed with respect to all data of the data area.

The timing chart in FIG. 13A is related to an arbitrary row given by Y=N and Y1=N in the data area and corresponds to the control flow in FIG. 11. In FIG. 13A, the read operation of the first box B1 corresponds to steps S12 to S17 described above, and the above commands are repeated 1024 times while sequentially counting up the row address X in the data area. A write operation of the check code corresponds to steps S18 to S23, the above commands are repeated 16 times while sequentially counting up the row address X1 in the first code area.

FIG. 12 is a control flow showing a process based on the second code system in the encode process. In the encode process in the embodiment, after the process based on the first code system, the process based on the second code system is started. The control shown in FIG. 12 is started, a row address X in the data area and a row address X2 in the second code area are set to 0 respectively (step S31).

The memory control command ACT (X) is executed (step S32), and a row address X is selected to set an active state. Subsequently, a column address Y in the data area is set to 0 (step S33). In this manner, the procedure of the control flow of the second code system is different from that of the control flow of the first code system in FIG. 11 in that ACT (X) is executed prior to setting of a column address Y.

In this state, the memory control command RD (Y) is executed (step S34), a bit at position (X,Y) in the data area is read. On the other hand, with execution of the command RD (Y), a codec control command GEN_CODE is executed (step S35), the bit at the position (X,Y) in the data area is input to the codec 16 as an object to be operated.

Then, Y is incremented (step S36), control in steps S34 to S37 is repeated until the value of Y reaches 1024 (step S37). As a result, an encoding operation using 1024 bits included in the second box B2 is completed. At this time, the shift register of the codec 16 is set in a state in which a 16-bit check code corresponding to the second box B2 is generated.

Next, a memory control command ACT (X2) is executed (step S38), and a row address X2 is selected to set an active state. Subsequently, a column address Y2 in the second code area is set to 0 (step S39). A memory control command WT_CODE is executed (step S40), and a memory control command WT (Y2) is executed (step S41). In this manner, the predetermined check bit generated by the codec 16 is transferred to the memory array 10, and a check bit based on the second code system is written at position (X2,Y2) in the second code area.

Then, Y2 is incremented (step S42), control in steps S40 to S43 is repeated until the value of Y2 reaches 16 (step S43). As a result, writing of the 16-bit check code based on the second code system in the second code area is completed.

Next, X and X2 are incremented to update row addresses in the data area and the second code area (step S44), control in steps S32 to S45 is repeated until the value of X reaches 1024 (step S45). In step S45, the same decision is made to X2. In this manner, the same encode process is repeated to the second box B2 of 1024 columns when the value of X ranges from 0 to 1023. At this time, generation and writing of a check code based on the second code system are completed with respect to all data to the data area.

The timing chart in FIG. 13B is related to an arbitrary column given by X=N and X2=N in the data area and corresponds to the control flow in FIG. 12. In FIG. 13B, the read operation of the second box B2 corresponds to steps S32 to S37 described above, and the respective commands are repeated 1024 times while sequentially counting up the column address Y in the data area. A write operation of the check code corresponds to steps S38 to S43, the above commands are repeated 16 times while sequentially counting up the column address Y2 in the second code area.

Figure 14:
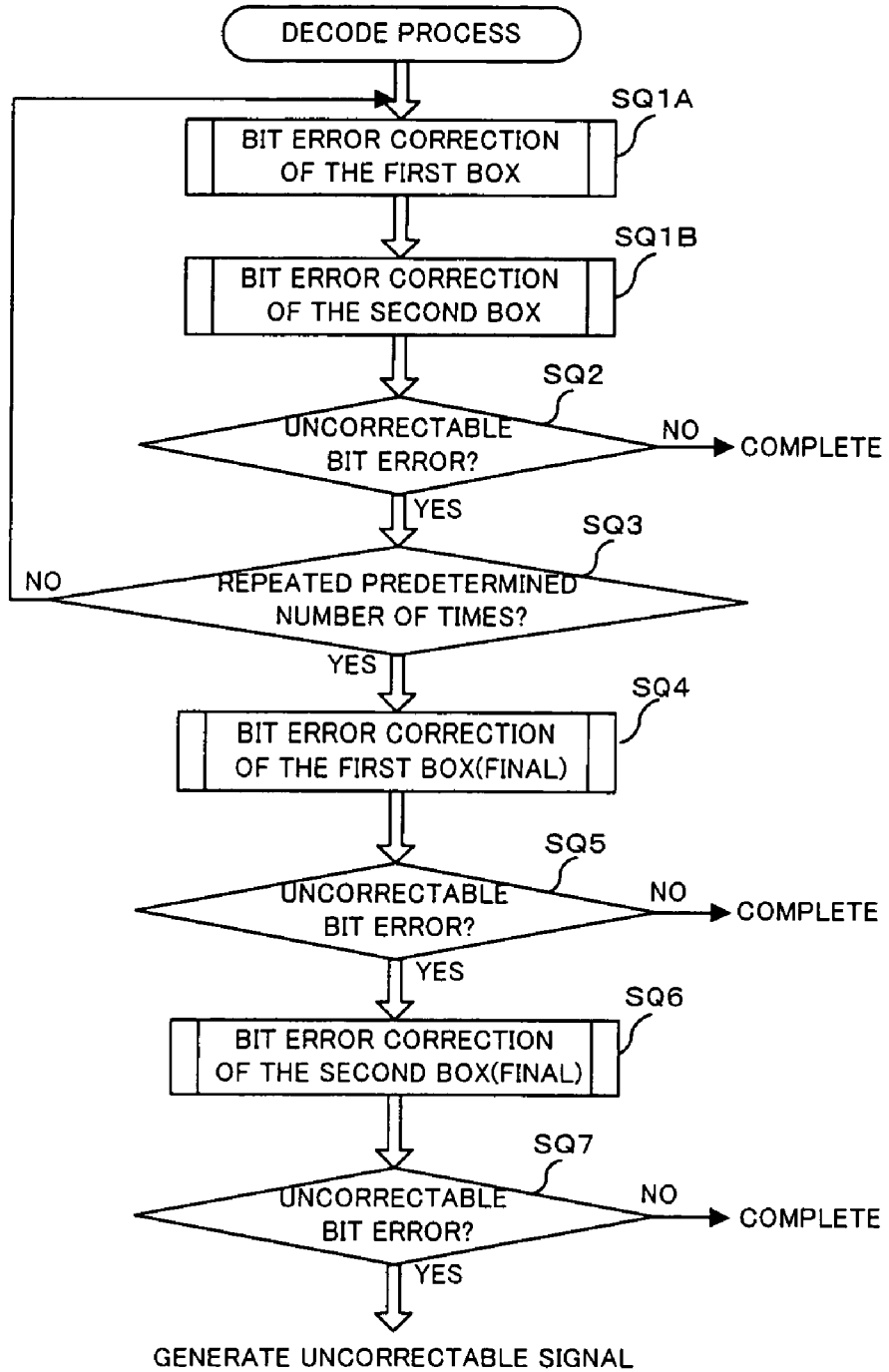
FIG. 14 is a flow chart showing a schematic control flow of the decode process.
Figure 20:
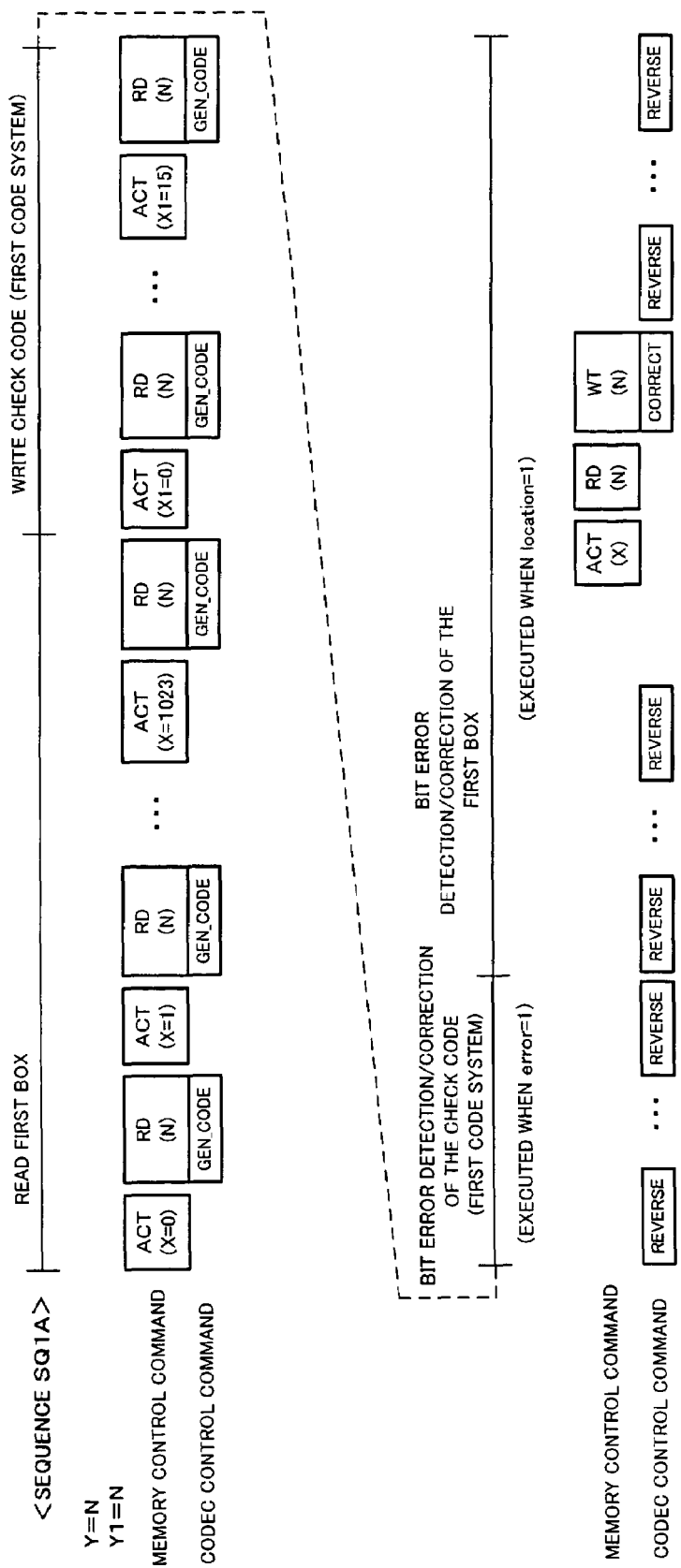
FIG. 20 is a timing chart corresponding to the control flow in FIG. 15.
Figure 21:
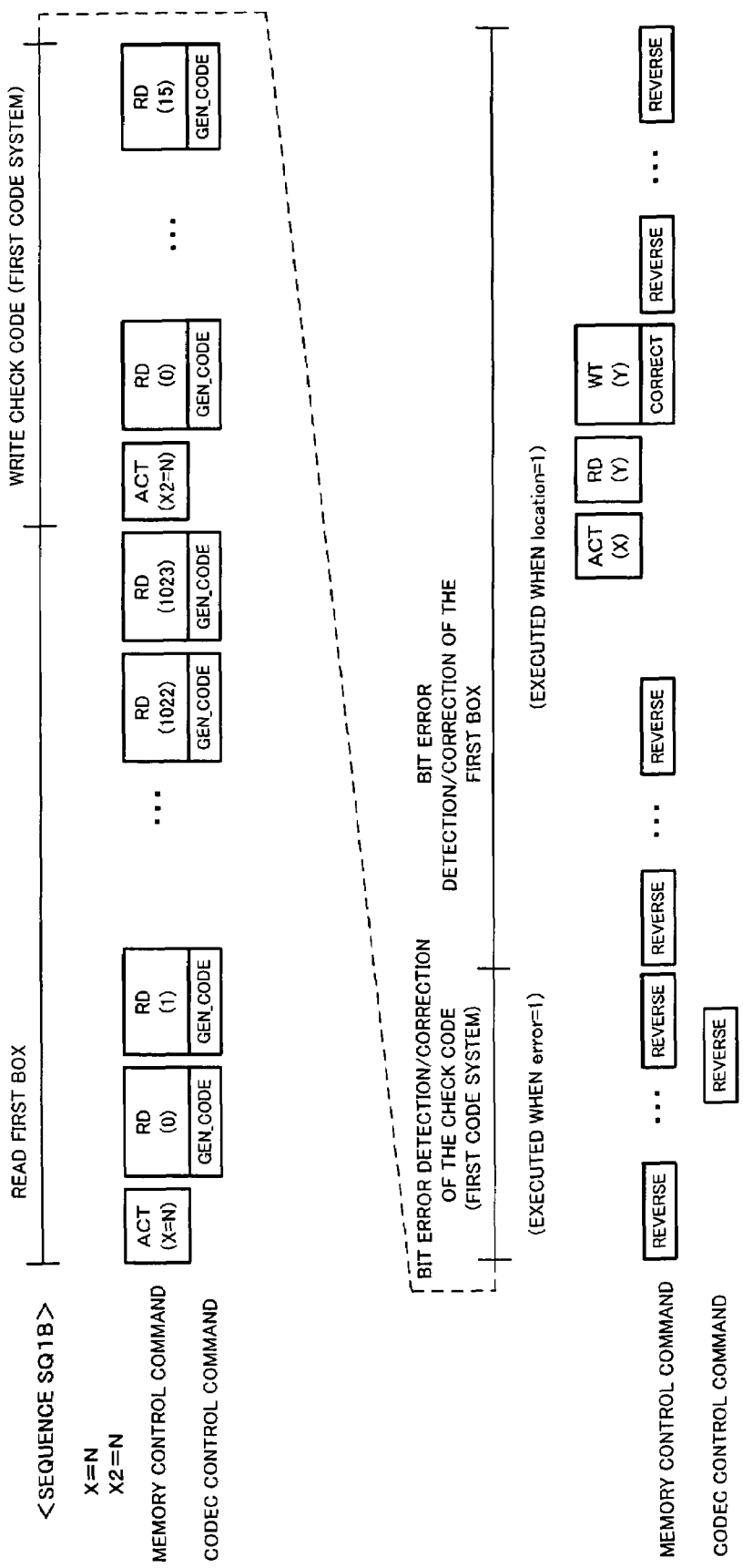
FIG. 21 is a timing chart corresponding to the control flow in FIG. 17.
Figure 22:
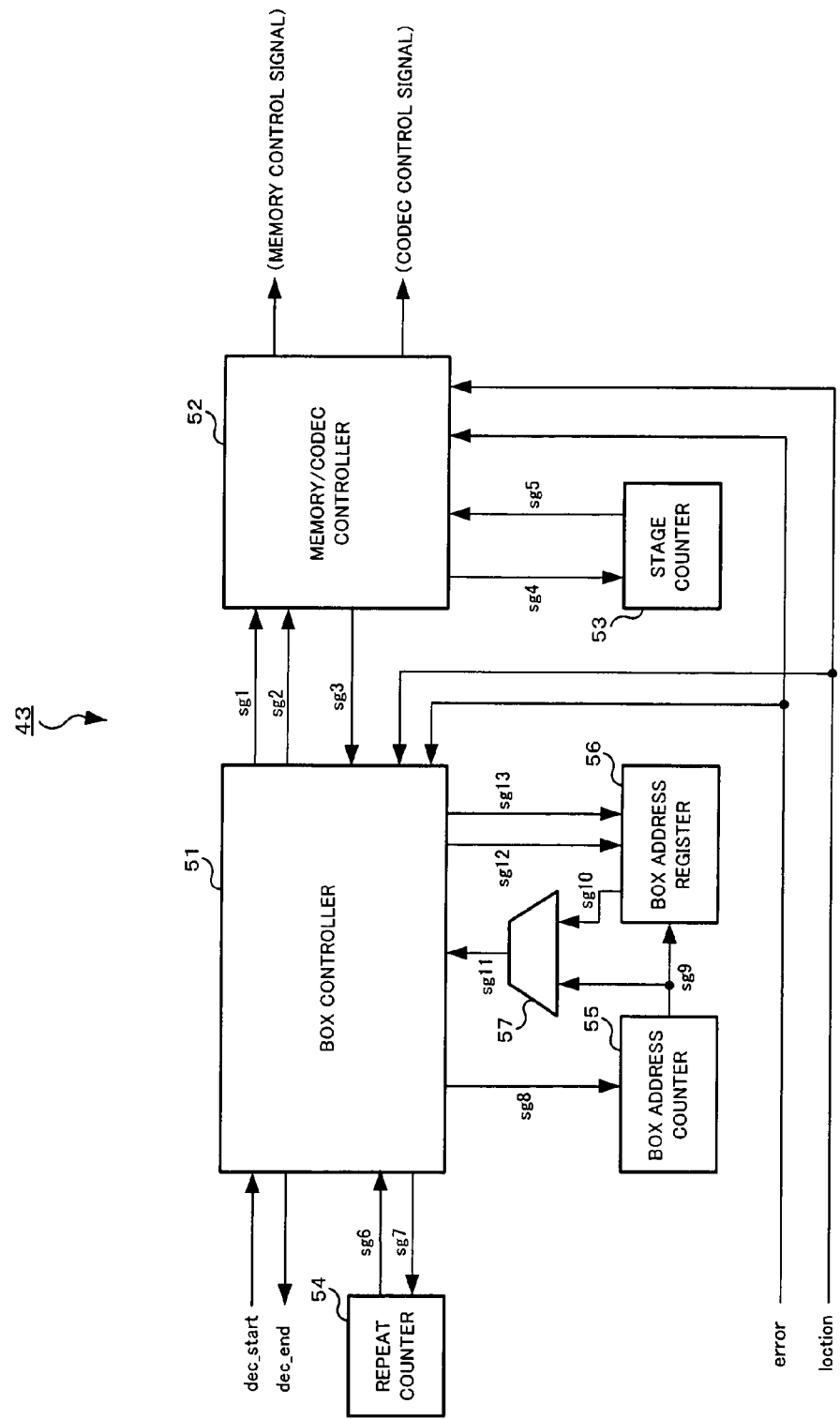
FIG. 22 is a block diagram showing the configuration of the decode controller which mainly controls the decode process.

Next, control procedures of the decode process according to the embodiment will be described below with reference to FIGS. 14 to 22. FIG. 14 is a flow chart showing a schematic control flow of the decode process, FIGS. 15 to 19 are flow charts showing a detailed control flow corresponding to the control flow in FIG. 14. FIGS. 20 and 21 are timing charts corresponding to the control flows in FIGS. 15 to 17. FIG. 22 is a block diagram showing the configuration of the decode controller 43 which mainly controls the decode process.

As shown in the schematic control flow in FIG. 14, the decode process according to the embodiment is constituted by a plurality of decode sequences SQ1 to SQ7 corresponding to a respective control object. The decode sequence SQ1 which performs bit error correction includes a decode sequence SQ1A which controls bit error correction of the first box B1 based on the first code system and a decode sequence SQ1B which controls bit error correction of the second box B2 based on the second code system.

The entire control flow in FIG. 14 is controlled by the decode controller 43 included in the ECC controller 33. As shown in FIG. 22, the decode controller 43 includes a box controller 51 which controls all the decode sequences SQ1 to SQ7, a memory/codec controller 52 which controls the memory array 10 and the codec 16 in the decode process for one first box B1 or one second box B2 (to be referred to as a target box hereinafter) to be processed, a stage counter 53 which counts stages (execution cycles) of the target box, a repeat counter 54 which counts the number of repeat times in the decode sequence SQ3 (to be described later), a box address counter 55 which counts the number of the target box to be processed, a box address register 56 which holds the number of the second box B2 including an uncorrectable bit error, and a selector 57 which selects the number of the target box to be processed.

Figure 15:
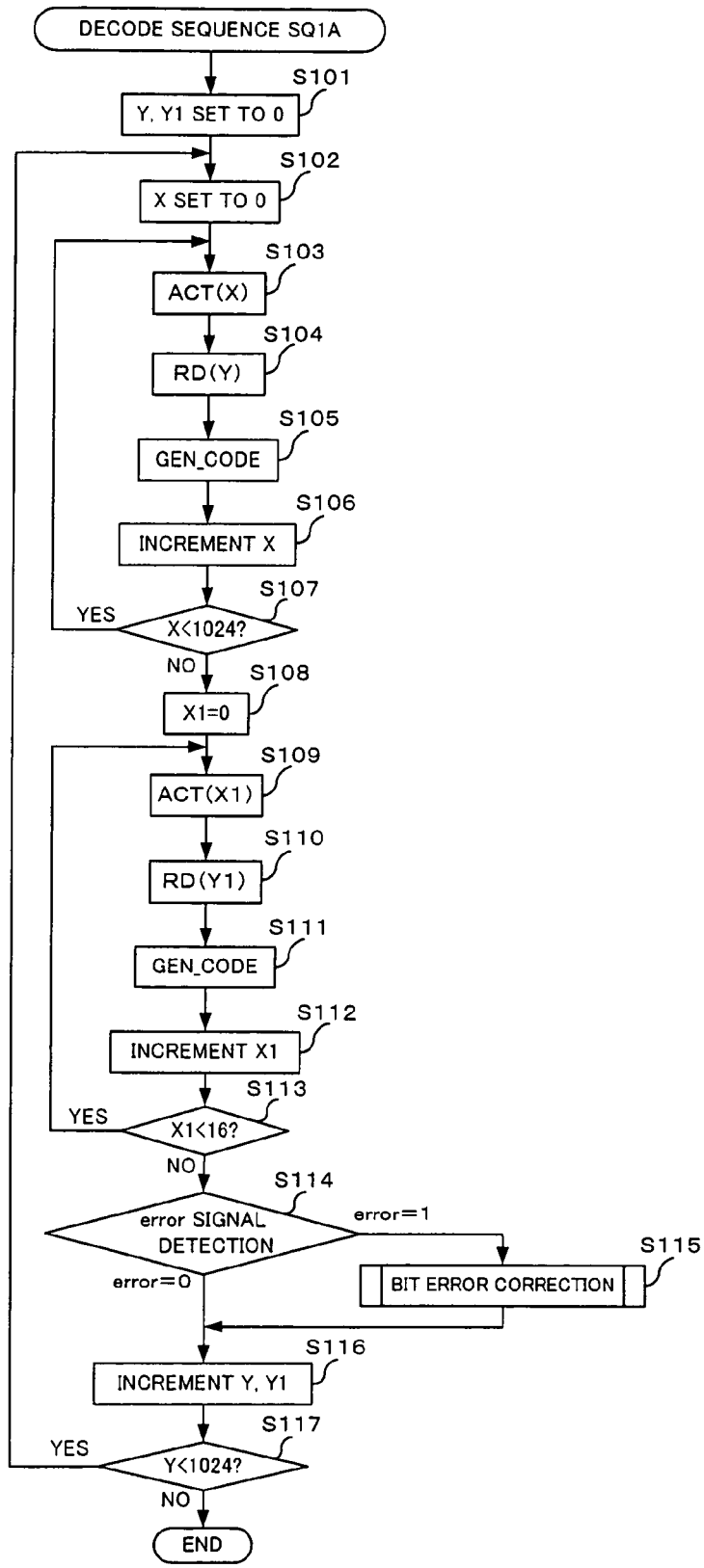
FIG. 15 is a flow chart showing a detailed control flow of the decode sequence SQ1A.

FIG. 15 is a flow chart showing a detailed control flow of the decode sequence SQ1A. When the control shown in FIG. 15 is started, a column address Y in the data area and a column address Y1 in the first code area are set to 0 respectively first (step S101). Subsequently, a row address X in the data area is set to 0 (step S102).

Next, the memory control command ACT (X) is executed (step S103), and the memory control command RD (Y) is executed (step S104). Thereby, a bit at the position (X,Y) in the data area is read. On the other hand, with the bit read operation, the codec control command GEN_CODE is executed (step S105), the read bit is input to the codec 16.

Then, X is incremented (step S106), control in steps S103 to S107 is repeated until the value of X reaches 1024 (step S107). As a result, a decoding operation is executed using 1024 bits included in the first box B1.

In subsequent steps S108 to S113, control for the first code area is executed by the same procedure as that of the control for the data area in steps S102 to S107. In this case, this may be considered on the assumption that the row address X is replaced with X1, the column address Y is replaced with Y1, and ranges of changes of the addresses are replaced with a range of 0 to 15.

When the determination result in step S113 becomes NO, the codec 16 is set in a state in which a decoding operation using total 1024 bits of a predetermined first box B1 and a check code corresponding thereto is completed. Therefore, it is decided on the basis of the error signal whether a bit error is generated as a result of an operation of the codec 16 (step S114).

Figure 16:
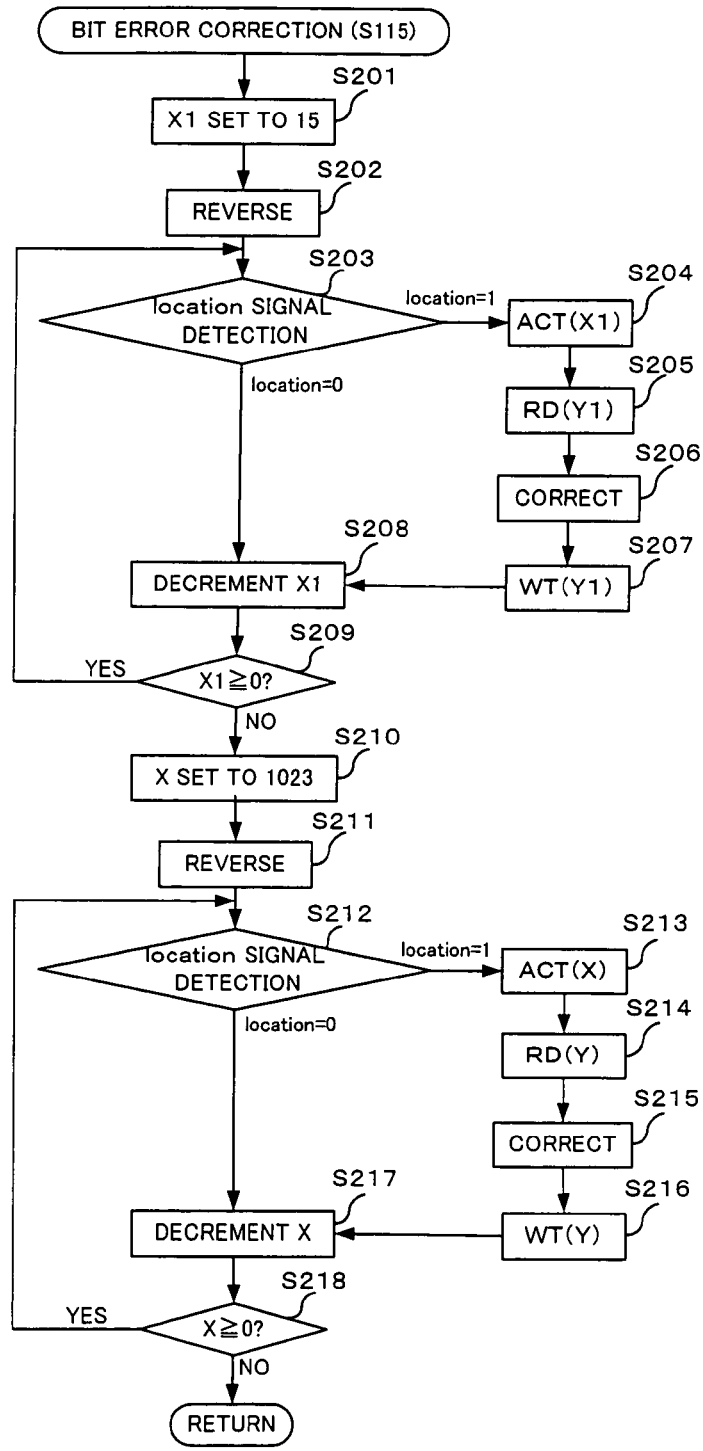
FIG. 16 is a control flow of the bit error correction executed in step S115 in FIG. 14.

When the error signal output from the codec 16 becomes 1 to indicate that a bit error is generated, bit error correction is executed to the first box B1 to be operated (step S115). In this case, a control flow of the bit error correction executed in step S115 is shown in FIG. 16. As shown in FIG. 16, when the first box B1 to be processed and the column addresses Y and Y1 in the first code area are set in advance, a row address X1 in the first code area is set to 15 (step S201).

Next, the codec control command REVERSE is executed (step S202), and, on the basis of the location signal output from the codec 16 when the 16-stage shift register is reversed, a position where a bit error is generated is detected (step S203). As a result, when the location signal becomes 1, the memory control command ACT (X1) is executed (step S204), and the memory control command RD (Y1) is executed (step S205) to read a check bit at position (X1,Y1) in the first code area.

Subsequently, the control command CORRECT is executed (step S206), a bit at which an error is generated is corrected. More specifically, as is apparent from FIG. 8, in the codec 16, rd_data (bit read in step S205) and an EOR operation output of the location signal are selectively output by the selector. So, the bit at which the error is generated is inverted and output as a signal wt_data.

The memory control command WT (Y1) is executed (step S207), the bit the error of which is corrected by the codec 16 is written at position (X1,Y1) in the first area. Subsequently, X1 is decremented (step S208), control in steps S203 to S209 is repeated until the value of X1 reaches 0 (step S209). When the determination result in step S209 becomes NO, control to the data area is started.

First, a row address X in the data area is set to 1023 (step S210). In subsequent steps S211 to S218, control to the data area is executed by the same procedure as that of the control for the first code area in steps S201 to S209. In this case, this may be considered on the assumption that the row address X1 is replaced with X, the column address Y1 is replaced with Y, and ranges of changes of the addresses are replaced with a range of 1023 to 0.

The condition: location=1 is satisfied in steps S203 and S212 only when a 1-bit error is present in one column of the mat 100. When an error of two or more bits is present, the location signal is not generated. Control to be performed in such a case will be described later.

When the determination result in step S218 becomes NO, a bit at which an error is detected is corrected, and the control flow in FIG. 16 is ended.

Returning to FIG. 15, subsequent to step S115 corresponding to the control flow in FIG. 16, Y and Y1 are incremented to update column addresses in the data area and the first code area (step S116). Control in steps S102 to S117 is repeated until the value of Y reaches 1024 (step S117). When the determination result in step S117 becomes NO, the decode sequence SQ1A is ended.

FIG. 20 shows a timing chart related to an arbitrary column which satisfies Y=N and Y1=N in the data area and the first code area corresponding to the control flow of the decode sequence SQ1A. In FIG. 20, in a read operation of a check code based on the first code system corresponding to steps S102 to S107, the commands are repeated 1024 times while sequentially counting up the row address in the data area. In the read operation of a check code corresponding to steps S108 to S113, the commands are repeated 16 times while sequentially counting up the row address X1 in the first code area. It is understood that bit error detection/correction operations to a check code and the first box B1 based on the first code system are differentially controlled depending on the error signal and the location signal.

Figure 17:
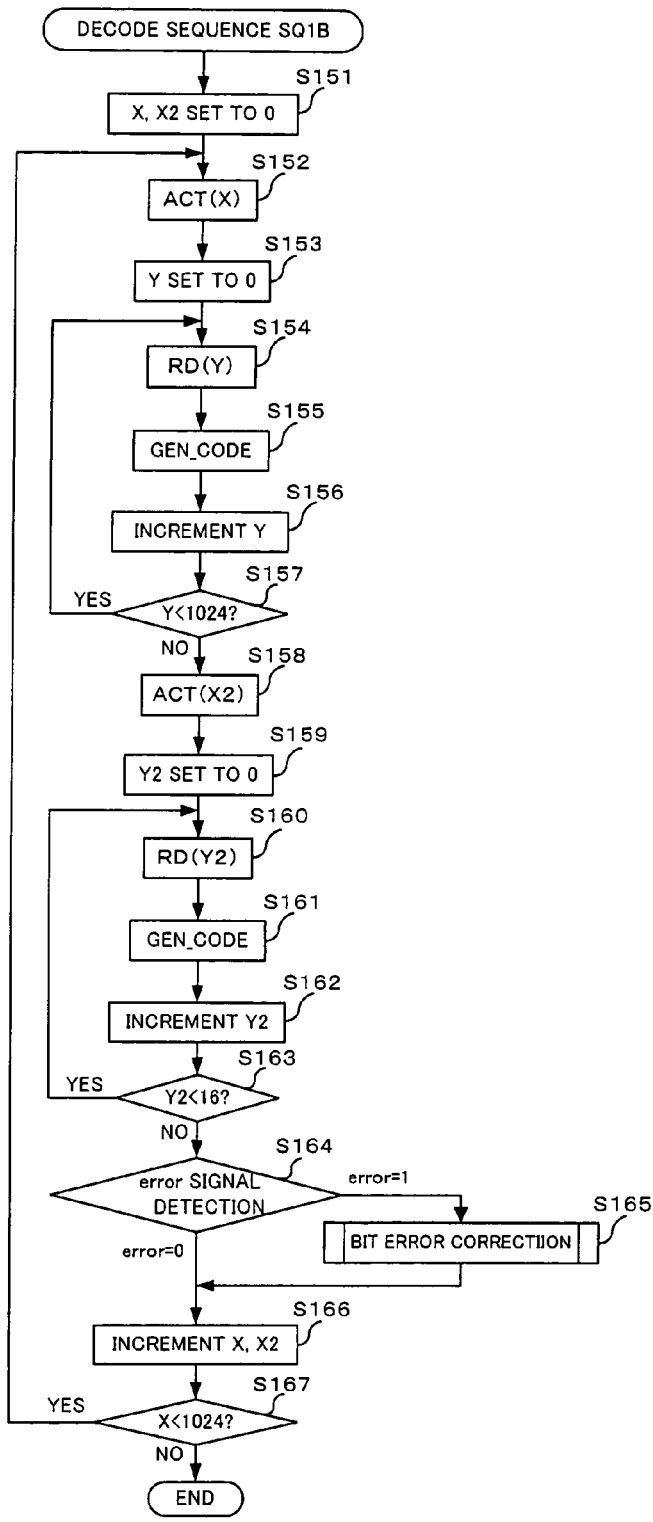
FIG. 17 is a flow chart showing a detailed control flow of the decode sequence SQ1B.

FIG. 17 is a flow chart showing a detailed control flow of the decode sequence SQ1B (FIG. 14). When the control shown in FIG. 17 is started, a row address X in the data area and the row address X2 in the second code area are set to 0 respectively first (step S151).

Next, the memory control command ACT (X) is executed (step S152). Subsequently, a column address Y in the data area is set to 0 (step S153). In this state, the memory control command RD (Y) is executed (step S154), a bit at position (X,Y) in the data area is read. On the other hand, with the bit read operation, the codec control command GEN_CODE is executed (step S155), the read bit is input to the codec 16.

Subsequently, Y is incremented (step S156), control in steps S154 to S157 is repeated until the value of Y reaches 1024 (step S157). As a result, a decoding operation of the codec 16 is executed using 1024 bits included in the second box B2.

In subsequent steps S158 to S163, control for the second code area is executed by the same procedure as that of the control for the data area in steps S152 to S157. In this case, this may be considered on the assumption that the row address X is replaced with X2, the column address Y is replaced with Y2, and ranges of changes of the addresses are replaced with a range of 0 to 15.

When the determination result in step S163 becomes NO, the codec 16 is set in a state in which a decoding operation using total 1024 bits of a predetermined second box B2 and a check code corresponding thereto is completed. Therefore, it is detected on the basis of the error signal whether a bit error is generated as a result of an operation of the codec 16 (step S164).

When the error signal output from the codec 16 becomes 1 to indicate that a bit error is generated, bit error correction is executed to the second box B2 to be operated (step S165). A control flow of the bit error correction executed in step S165 is shown in FIG. 18.

Figure 18:
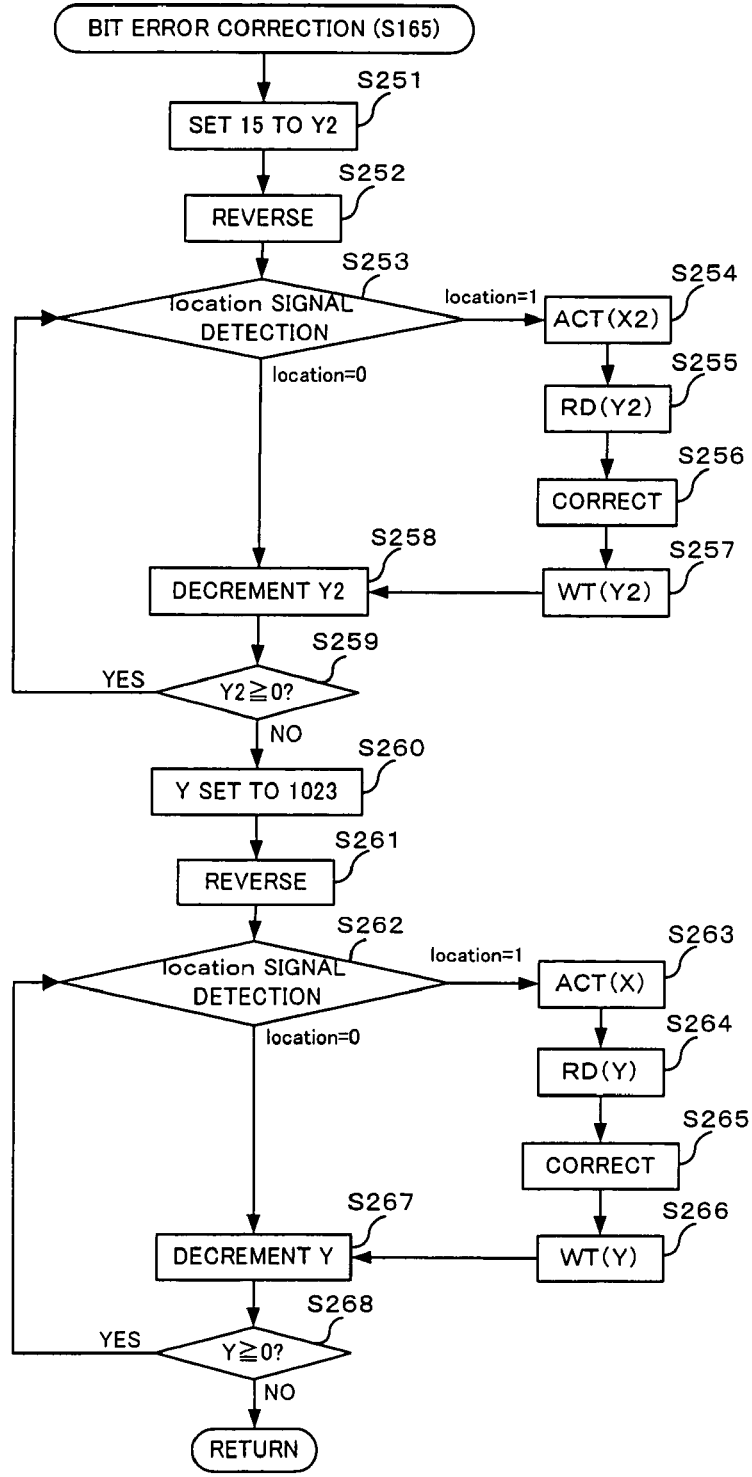
FIG. 18 is a control flow of the bit error correction executed in step S165 in FIG. 17.

In the control flow shown in steps S251 to S268 in FIG. 18, a basic control procedure is the same as that of the control flow shown in steps S201 to S218 in FIG. 16. This may be considered on the assumption that the values X1 and X in FIG. 16 are replaced with the values Y2 and Y in FIG. 18. When the determination result in the final step S268 becomes NO, a bit the error of which is detected is corrected, and the control flow in FIG. 18 is ended.

Returning to FIG. 17, subsequent to step S165 corresponding to the control flow in FIG. 18, X and X2 are incremented to update row addresses in the data area and the first code area (step S166). Control in steps S152 to S167 is repeated until the value of X reaches 1024 (step S167). When the determination result in step S167 becomes NO, the decode sequence SQ1B is ended.

FIG. 21 shows a timing chart related to an arbitrary row which satisfies X=N and X2=N in the data area and the second code area and corresponding to the control flow of the decode sequence SQ1B. In FIG. 21, in a read operation of a check code based on the second code system corresponding to steps S152 to S157, the commands are repeated 1024 times while sequentially counting up the column address Y in the data area. In the read operation of a check code corresponding to steps S158 to S163, the commands are repeated 16 times while sequentially counting up the column address Y2 in the second code area. It is understood that bit error detection/correction operations to a check code and the second box B2 based on the second code system are differentially controlled depending on the error signal and the location signal as in the case shown in FIG. 20.

In the two decode sequences SQ1A and SQ1B, in the decode controller 43 in FIG. 22, the box controller 51 recognizes processing timings of respective target boxes. The box controller 51 outputs a box start signal sg1 representing a processing start timing of a target box and a box address signal sg2 representing a number (address) of the target box to the memory/codec controller 52. In the memory/codec controller 52, a memory control signal and a codec control signal required for a decode process of the target box are generated and output. The memory/codec controller 52 outputs a box end signal sg3 representing a processing completion timing of the target box to the box controller 51.

The number of the target box is generated by the box address counter 55. The box controller 51 controls the box address counter 55 on the basis of a control signal sg8. The box address counter 55 outputs its counter value as a box number count signal sg9.

Furthermore, in processing of the target box, the memory/codec controller 52 supplies a counter control signal sg4 to the stage counter 53 to perform control depending on a forward/backward direction of the shift register of the codec 16. The stage counter 53 is controlled to be incremented in a forward operation of the codec 16 and to be decremented in a backward operation of the codec 16. The memory/codec controller 52 receives a count signal sg5 representing a count value of the stage counter 53 to recognize a cycle to be executed on the basis of the count signal sg5.

As shown in FIG. 14, in the decode sequence SQ2 subsequent to the decode sequences SQ1A and SQ1B, it is decided whether an uncorrectable bit error is present in the decode sequence SQ1A or SQ1B. More specifically, in the error correction method according to the embodiment, only a 1-bit error which is present in the target box can be corrected, and an error of two or more bits which is present in the target box cannot be corrected. In the circuit configuration of the codec 16, even though error=1 is satisfied, location=1 is not satisfied in the presence of the error of two or more bits. For this reason, this state is detected in the decode sequence SQ2.

In FIG. 22, the error signal and the location signal output from the codec 16 are input to the box controller 51 and the memory/codec controller 52. When error=1 and location=1 are satisfied, the box controller 51 recognizes the presence of a bit error and that the bit is corrected, and bit error correction is executed by the control of the memory/codec controller 52. On the other hand, the box controller 51 recognizes generation of an uncorrectable bit error when error=1 is satisfied and location=1 is not satisfied.

In the embodiment, when it is recognized that an uncorrectable bit is present in the second box B2, the number (row address X) of the second box B2 is held. More specifically, in a state in which a hold signal sg13 (sg13=1) is supplied from the box controller 51 to the box address register 56, the number of the corresponding second box B2 is transmitted as a box address signal sg9 from the box address counter 55 to the box address register 56. When N uncorrectable second boxes B2 are present in the box address register 56, the numbers of the second boxes B2 and the value N are held in the box address register 56.

A read signal sg10 of the box address register 56 is transmitted to the selector 57. The selector 57 selectively switches the box number count signal sg9 from the box address counter 55 and the read signal sg10 from the box address register 56, and outputs a selection signal sg11 to the box controller 51.

In FIG. 14, it is determined that an uncorrectable bit error is not present in the decode sequence SQ2, the subsequent error correction is not necessary, so the decode process in FIG. 14 is completed. On the other hand, when it is determined that an uncorrectable bit error is present in the decode sequence SQ2, subsequently, the decode sequence SQ3 is executed.

In the decode sequence SQ3, it is decided whether the decode sequence SQ1 is completed times, the number of which is set in advance. More specifically, in the embodiment, error corrections in the row direction and the column direction are alternately repeated to reduce the number of bit errors. When the number of repeat times is increased, the possibility of correcting bit errors increases accordingly. Therefore, the embodiment makes it possible to appropriately set the number of repeat times in advance.

In the decode controller 43 in FIG. 22, the numbers of repeat times of the decode sequences SQ1 and SQ2 are counted by the repeat counter 54. The box controller 51 transmits a decrement signal to the repeat counter 54 each time the decode sequences SQ1 and SQ2 are executed, and outputs the count value to the box controller 51 as a count signal sg6. Thereby, the box controller 51 can recognize that the count value reaches the predetermined number of repeat times.

When it is decided that it is repeated the predetermined number of repeat times in the decode sequence SQ3, the decode sequence SQ4 is subsequently started. In the decode sequence SQ4, as in the decode sequence SQ1A, bit error correction of the first box B1 is performed as a final process when the process is repeated the number of times. In the subsequent decode sequence SQ5, the same decision as that in the decode sequence SQ2 is performed.

When it is decided that an uncorrectable bit error is present in the decode sequence SQ5, the decode sequence SQ6 is sequentially started. In the decode sequence SQ6, bit error correction of the second box B2 is performed as a final process when the process is repeated a number of times. Since the process in the decode sequence SQ6 is partially different from the process in the decode sequence SQ1B, the process in the decode sequence SQ6 will be described below.

Figure 19:
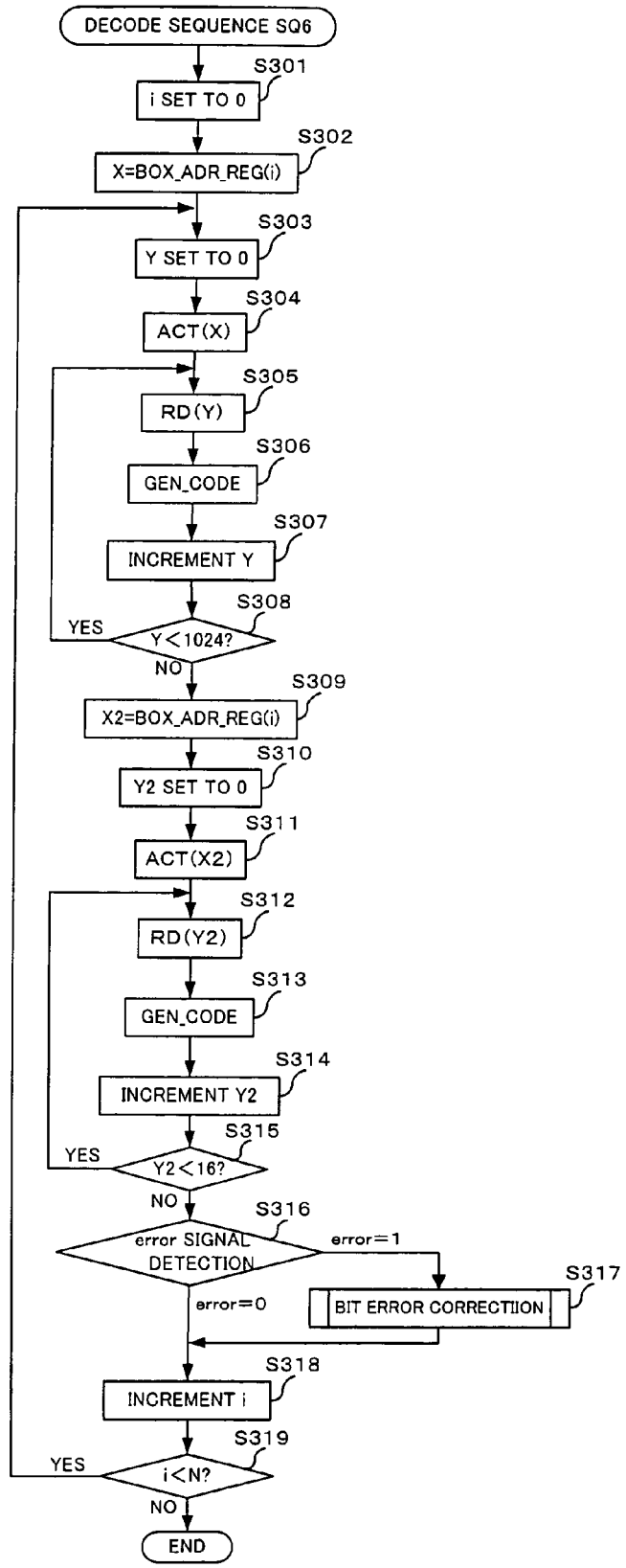
FIG. 19 is a flow chart showing a detailed control flow of the decode sequence SQ6.

FIG. 19 is a flow chart showing a detailed control flow of the decode sequence SQ6. The basic control of the decode sequence SQ6 is in common with the decode sequence SQ1B in FIG. 17 except for a setting procedure of a row address X. More specifically, as shown in FIG. 19, a counter i is set to 0 (step S301), an i-th value BOX_ADR_REG (i) held in the box address register 56 is set as a value of X (step S302). Similarly, the value BOX_ADR_REG (i) is set as a value of X2 (step S309). After control in steps S303 to S317 is executed, the counter i is incremented (step S318), and the processes in step S303 to S319 are repeated until the value i reaches the value N held in the box address register (step S319).

In this manner, in the decode sequence SQ6, when bit error correction which executed to the second box B2 is performed, control is performed to execute new bit error correction to only the second box B2 in which an uncorrectable bit is present. Thereby, an unnecessary process can be avoided, and execution time of all the processes can be shortened. When the predetermined number of times is set as 1 in the decode sequence SQ3, bit error correction is alternately executed at least twice for the first box B1 and the second box B2.

Finally, in the decode sequences SQ7, the same decision as in the decode sequences SQ2 and SQ5 is performed. When it is determined that an uncorrectable bit error is not present in the decode sequence SQ7, the decode process in FIG. 14 is completed. On the other hand, it is decided that an uncorrectable bit error is present in the decode sequence SQ7, a predetermined uncorrectable signal is generated. An abnormality of DRAM can be detected with reference to the uncorrectable signal.

Figure 23A:
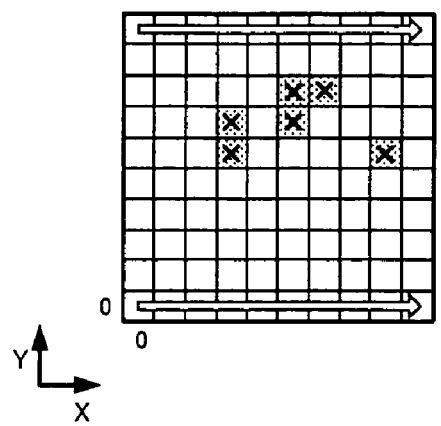
FIG. 23A is a diagram showing a first state of a concrete example of an error correction method of the embodiment.

Next, a concrete correction method according to the embodiment will be described below with reference to FIGS. 23A to 23D. For descriptive convenience, a data area having a size of 10×10 will be exemplified. As shown in FIG. 23A, when a 6-bit error is present in the data area (indicated by a mark x in FIG. 23A), the decode sequence SQ1A is executed to bit strings in the X direction. In this case, the 2-bit errors are present in all the three columns, so the bit errors cannot be corrected.

Figure 23B:
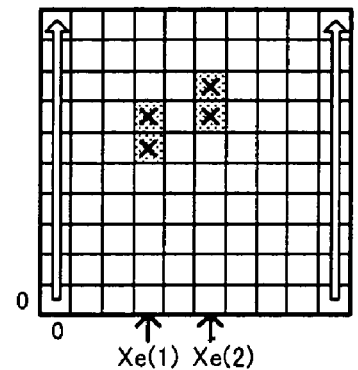
FIG. 23B is a diagram showing a second state of a concrete example of an error correction method of the embodiment.

As shown in FIG. 23B, the decode sequence SQ1B is executed to bit strings in the Y direction. In this case, errors of two rows in which 2-bit errors are present cannot be corrected. However, errors of the other two rows in which 1-bit errors are present are corrected. At this time, pieces of position information Xe(1) and Xe(2) representing uncorrectable rows are held.

Figure 23C:
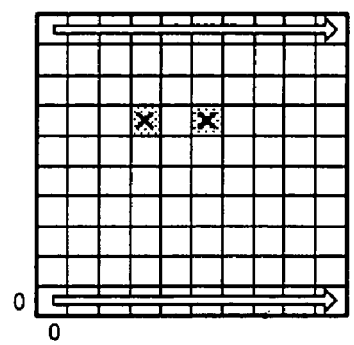
FIG. 23C is a diagram showing a third state of a concrete example of an error correction method of the embodiment.

As shown in FIG. 23C, the decode sequence SQ4 is executed to bit strings in the X direction (the number of repeat times of the decode sequence SQ3 is set as 1). In this case, since an error pattern in FIG. 23A changes, the errors of the two columns in which 1-bit errors are present are corrected. One column in which a 2-bit error is present is left.

Figure 23D:
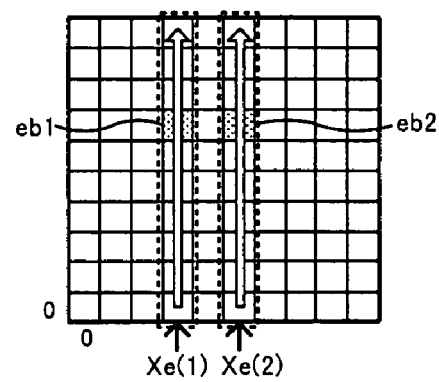
FIG. 23D is a diagram showing a fourth state of a concrete example of an error correction method of the embodiment.

Finally, as shown in FIG. 23D, the decode sequence SQ6 is executed to bit strings in the Y direction. At this time, error correction is executed to only the held pieces of position information Xe(1) and Xe(2), and both error bits eb2 and eb2 left on the two rows are corrected. As a result, all bit errors in the data area are corrected. Even in a more complex error pattern, the possibility of correcting all the bit errors can be increased by increasing the number of repeat times.

In addition, even though the number of repeat times is increased, bit errors cannot be corrected depending on an error pattern. For example, the case corresponds to a case in which a 4-bit error included in a 2×2 square area is present. In this case, the errors are always left even though error correction is repeated in the X direction and the Y direction. In order to avoid this state, when a state in which a bit error is uncorrectable in an area having a predetermined shape continues, it is decided that all the bits in the area are erroneous, and control may be performed to inverse the bits.

According to DRAM of the embodiment described above, error correction to an error pattern which cannot be corrected by a conventional technique can be performed, and a permissible bit error rate can be increased. More specifically, employment of the error correction method makes it possible to increase a permissible bit error rate from 0.01% of the conventional technique to about 0.02%. Since the permissible bit error rate can be increased, a long refresh period can be set. Accordingly, power consumption in a data holding state can be reduced. More specifically, at a temperature of 85 degree Celsius, the refresh period can be elongated to be approximately twice a conventional refresh period.

The present invention is described on the basis of the embodiment. However, the present invention is not limited to the embodiment, and various changes can be made without departing from the spirit and scope of the invention. For example, the configuration and the capacity of the memory arrays 10 are not limited to the concrete examples described above, and the present invention can be widely applied to various memory means.

The invention claimed is:

1. A semiconductor memory device comprising:
a memory array having a data area in which data is stored and a check code area in which a check code for error detection/correction of said data is stored;
a refresh control means which controls a refresh operation of said memory array in a data holding state using a predetermined period;
an operation means which executes an encoding operation for generating said check code using a bit string in said data area as a processing unit for said encoding operation, and executes a decoding operation for performing said error detection/correction of said data using said check code;
an encode control means for controlling an encode process in which, in a change to said data holding state, in a first direction and a second direction orthogonal to each other in said memory array, a first code generated by said operation means on the basis of said bit string in said first direction and a second code generated by said operation means on the basis of said bit string in said second direction are written in said check code area in a distinguishable manner; and
a decode control means for controlling a decode process in which, at the end of said data holding state, a first bit error correction based on said first code in said first direction and a second bit error correction based on said second code in said second direction are alternately performed by said operation means, and said first bit error correction and said second bit error correction are performed at least twice respectively.

2. The semiconductor memory device according to claim 1, wherein said operation means outputs a first signal representing that an error of at least one bit is generated in a bit string to be decoded and a second signal representing a bit position at which only a 1-bit error is generated in said bit string.

3. The semiconductor memory device according to claim 2, wherein said decode control means determines that an uncorrectable bit error is present in a bit string to be decoded in the case that in said second bit error correction said first signal is output and said second signal is not output.

4. The semiconductor memory device according to claim 3, wherein when said decode control means determines that said uncorrectable bit error is present in said bit string to be decoded, position information of said bit string is held, and said second bit error correction is performed to said bit string of said held position information in a subsequent one of said second bit error correction.

5. The semiconductor memory device according to claim 1, wherein said decode control means controls such that said first bit error correction and said second bit error correction are performed a predetermined number of times, respectively.

6. The semiconductor memory device according to claim 1, wherein said first direction comprises a row direction of said memory array, and said second direction comprises a column direction of said memory array.

7. The semiconductor memory device according to claim 1, further comprising a mode control means which controls changing of a normal operation mode in which an operation in normal state is controlled and a low-power-consumption mode in which an operation is controlled to reduce power consumption in said data holding state, wherein said refresh control means controls said refresh operation using a long period in said low-power-consumption mode.

8. An error correction method for a semiconductor memory device having a memory area comprising a data area in which data is stored and a check code area in which a check code for error detection/correction of said data is stored, comprising performing an operation which executes an encoding operation for generating said check code using a bit string in said data area as a processing unit for said encoding operation, and executes a decoding operation for performing said error detection/correction of said data using said check code;

controlling an encode process in which, in a change to said data holding state, in a first direction and a second direction orthogonal to each other in said memory array, a first code generated by said operation on the basis of said bit string in said first direction and a second code generated by said operation on the basis of said bit string in said second direction are written in said check code area in a distinguishable manner; and controlling a decode process in which, at the end of said data holding state, a first bit error correction based on said first code in said first direction and a second bit error correction based on said second code in said second direction are alternately performed by said operation, and said first bit error correction and said second bit error correction are performed at least twice respectively.

9. The error correction method for a semiconductor memory device according to claim 8, wherein, when in said decode process, an uncorrectable bit error is present in a bit string to be decoded, position information of said bit string is held, and said second bit error correction is performed to said bit string of said held position information in a subsequent one of said second bit error correction.

10. The error correction method for a semiconductor memory device according to claim 8, wherein said first bit error correction and said second bit error correction are performed a predetermined number of times, respectively.

11. A decode process for a semiconductor memory device, comprising:

performing bit error correction on a first box based on a first code system and on a second box based on a second code system, said bit error correction yielding a result of either:

a correctable bit error that completes said decode process, or an uncorrectable bit error, in which case said bit error correction is repeated until either:

said correctable bit error that completes said decode process is obtained; or a predetermined number of repetitions of said bit error correction has occurred, in which case said bit error correction is performed a final time on a first box yielding either:

said correctable bit error that completes said decode process; or said uncorrectable bit error, in which case said bit error correction is performed a final time on a second box yielding either:

said correctable bit error that completes said decode process; or said uncorrectable bit error, in which case a predetermined uncorrectable bit error signal is generated from said decode process.

12. The decode process according to claim 11, wherein said correctable bit error comprises a 1-bit error and said uncorrectable bit error comprises an error of two or more bits.

13. The decode process according to claim 11, wherein the number of said second box is held when an uncorrectable bit is present in said second box.

14. The decode process according to claim 11, wherein, when said bit error correction is repeated until either said correctable bit error that completes said decode process is obtained or a predetermined number of repetitions of said bit error correction has occurred, said bit error correction is alternately repeated in a row direction and a column direction.

15. The decode process according to claim 11, wherein, when said bit error correction is repeated until either said correctable bit error that completes said decode process is obtained or a predetermined number of repetitions of said bit error correction has occurred, when said predetermined number of repetitions is increased, the possibility of yielding the result of said correctable bit error increases.

* * * * *